United States Patent
Chen et al.

(10) Patent No.: US 12,302,208 B2
(45) Date of Patent: May 13, 2025

(54) COMMUNICATION METHOD AND APPARATUS

(71) Applicant: HUAWEI TECHNOLOGIES CO., LTD., Guangdong (CN)

(72) Inventors: Lei Chen, Beijing (CN); Bingzhao Li, Beijing (CN); Zonghui Xie, Shenzhen (CN); Hong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 354 days.

(21) Appl. No.: 17/883,892

(22) Filed: Aug. 9, 2022

(65) Prior Publication Data

US 2022/0394452 A1 Dec. 8, 2022

Related U.S. Application Data

(63) Continuation of application No. PCT/CN2020/074764, filed on Feb. 11, 2020.

(51) Int. Cl.
*H04W 68/00* (2009.01)
*H04W 4/90* (2018.01)

(52) U.S. Cl.
CPC .......... *H04W 4/90* (2018.02); *H04W 68/00* (2013.01)

(58) Field of Classification Search
CPC .............................. H04W 4/90; H04W 68/00
USPC ...................................................... 455/404.1
See application file for complete search history.

(56) References Cited

U.S. PATENT DOCUMENTS

| | | | |
|---|---|---|---|
| 2009/0253401 A1 | 10/2009 | Lee et al. | |
| 2011/0151828 A1 | 6/2011 | Gou et al. | |
| 2019/0045405 A1* | 2/2019 | Byun | H04W 48/18 |
| 2021/0306934 A1* | 9/2021 | Yang | H04W 68/005 |

FOREIGN PATENT DOCUMENTS

| | | | | |
|---|---|---|---|---|
| CN | 101594660 A | 12/2009 | | |
| CN | 101640574 A | 2/2010 | | |
| CN | 101662754 A | 3/2010 | | |
| CN | 101677428 A | 3/2010 | | |
| CN | 101686541 A | 3/2010 | | |
| CN | 101959134 A | 1/2011 | | |
| CN | 109076314 A | 12/2018 | | |
| CN | 109565743 A | 4/2019 | | |
| CN | 109644408 A | 4/2019 | | |
| CN | 110149694 A | 8/2019 | | |
| CN | 110351831 A | 10/2019 | | |
| CN | 110945928 A | * | 3/2020 | H04W 16/14 |
| EP | 3833060 A1 | 6/2021 | | |

(Continued)

OTHER PUBLICATIONS

Translation_CN 110945928.*

(Continued)

*Primary Examiner* — Ted M Wang
(74) *Attorney, Agent, or Firm* — Fish & Richardson P.C.

(57) ABSTRACT

Embodiments of this application provide example communication methods and apparatuses. One example method includes receiving a paging message from a network device, where the paging message includes first information, and the first information is used to indicate a resource location of a public warning system message. The public warning system message is received based on the paging message.

20 Claims, 8 Drawing Sheets

(56) References Cited

FOREIGN PATENT DOCUMENTS

| IN | 107925983 A | 4/2018 |
|---|---|---|
| WO | 2020014968 A1 | 1/2020 |

OTHER PUBLICATIONS

3GPP TS 22.168 V8.3.0 (Dec. 2012), "3rd Generation Partnership Project; Technical Specification Group Services and System Aspects; Earthquake and Tsunami Warning System (ETWS) requirements; Stage 1 (Release 8)," Dec. 2012, 12 pages.

Oppo et al., "Remove the system information change indication and PWS notification in paging message," 3GPP TSG-RAN WG2 NR AH1807, R2-1810840, Montreal, Canada, Jul. 2-6, 2018, 6 pages.

PCT International Search Report and Written Opinion issued in International Application No. PCT/CN2020/074764 on Oct. 20, 2020, 18 pages (with English translation).

Panasonic, "ETWS Support in Rel-8," 3GPP TSG RAN WG2 #61bis, R2-082231, Shenzhen, China, Mar. 31,-Apr. 4, 2008, 2 pages.

Extended European Search Report in European Appln No. 20918790.5, dated Dec. 14, 2022, 10 pages.

* cited by examiner

COMMUNICATION METHOD AND APPARATUS

CROSS-REFERENCE TO RELATED APPLICATIONS

This application is a continuation of International Application No. PCT/CN2020/074764, filed on Feb. 11, 2020, the disclosure of which is hereby incorporated by reference in its entirety.

TECHNICAL FIELD

This application relates to the field of communication technologies, and in particular, to a communication method and apparatus.

BACKGROUND

A public warning system message refers to warning information, for example, warning information such as an earthquake, a tsunami, or a terrorist attack, that is sent to the public when a serious social hazard event may occur. Because the serious social hazard event relates to personal and property safety problems, how to quickly and effectively send the public warning system message to a terminal device, and how the terminal device quickly receives the public warning system message to remind a user to make a decision and avoid a loss are technical problems that are being studied by a person in the art.

SUMMARY

Embodiments of this application disclose a communication method and apparatus, to improve transmission efficiency of a public warning system message.

A first aspect of embodiments of this application discloses a communication method. The method is applicable to a communication apparatus, the communication apparatus is, for example, a terminal device, and the method includes:
receiving a paging message from a network device, where the paging message is used to indicate the terminal device to receive a public warning system message, the paging message includes indication information, and the indication information is used to indicate that scheduling information of the public warning system message does not change; and
determining, based on the paging message, to receive the public warning system message.

In the foregoing method, the terminal device directly receives the paging message, and determines, based on the paging message, to receive the public warning system message. Therefore, after receiving the paging message, the terminal device does not need to read a system information block type 1 (SIB1), does not need to obtain, based on a scheduling list of a system information message (SI message) in the SIB1, scheduling information of an SI message including the public warning system message, does not need to determine, based on the scheduling information, a system information window (SI window) location of the SI message carrying public warning system information, and does not need to finally receive the public warning system message at the SI window location. This greatly reduces time for obtaining the public warning system message, and improves a speed of obtaining the public warning system message by the terminal device.

In an optional solution, the terminal device receives the public warning system message based on the scheduling information, where the scheduling information comes from the network device.

A second aspect of embodiments of this application discloses a communication method. The method is applicable to a communication apparatus, the communication apparatus is, for example, a terminal device, and the method includes:
receiving a paging message from a network device, where the paging message includes first information, and the first information is used to indicate a resource location of a public warning system message; and
receiving the public warning system message based on the paging message.

In the foregoing method, the terminal device directly receives the paging message, where the paging message includes the first information used to indicate a system information window (SI window) location of the public warning system message; and receives the public warning system message based on the first information. In the foregoing method, the terminal device can quickly obtain the public warning system message. Therefore, after receiving the paging message, the terminal device does not need to read a SIB1, does not need to obtain, based on a scheduling list of an SI message in the SIB1, scheduling information of an SI message including the public warning system message, does not need to determine, based on the scheduling information, the SI window location of the SI message carrying the public warning system information, and does not need to finally receive the public warning system message at the SI window location. This greatly improves a speed of obtaining the public warning system message by the terminal device.

In an optional solution, the first information includes scheduling information and indication information of the public warning system message, and the indication information is used to indicate a sequence number of the scheduling information in a system message scheduling information list.

In the foregoing method, after receiving the paging message, the terminal device may directly determine the resource location (a time location of a system information scheduling window where the system information scheduling window may be specifically the SI window) of the public warning system message by using the scheduling information and the indication information in the first message, and obtain the public warning system message based on the SI window location. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the first information includes downlink control information, and the downlink control information is used to indicate to send a time-frequency resource location of the public warning system message.

In the foregoing method, after receiving the paging message, the terminal device may directly obtain the public warning system message by using the downlink control information that is in the first information and that is used to indicate the time-frequency resource location of the public warning system message. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the terminal device monitors the paging message on continuous paging occasions.

In another optional solution, the terminal device receives wake-up indication information from the network device, where the wake-up indication information is used to indicate the terminal device to receive the public warning system message.

In the foregoing method, the terminal device monitors the wake-up indication information in a first periodicity, where the wake-up indication information is used to indicate the terminal device to receive the public warning system message; and monitors the paging message in a second periodicity, so that a balance can be achieved between quickly receiving the public warning system message and reducing power consumption of the terminal device.

In another optional solution, the terminal device receives a first broadcast message from the network device, where the first broadcast message includes first periodicity information, and the first periodicity information is used to indicate that a sending periodicity of the wake-up indication information is the first periodicity.

In another optional solution, the terminal device monitors the paging message in the second periodicity, where the paging message is used to indicate that a system message changes or indicate the terminal device to receive a service related to the terminal device, and the second periodicity is greater than the first periodicity.

In another optional solution, the terminal device receives a second broadcast message sent by the network device, where the second broadcast message is used to indicate that the network device supports sending of the wake-up indication information (WUS).

A third aspect of embodiments of this application discloses a communication method. The method is applicable to a communication apparatus, the communication apparatus is, for example, a network device, and the method includes:

sending a paging message to a terminal device, where the paging message is used to indicate the terminal device to receive a public warning system message, the paging message includes indication information, the indication information is used to indicate that scheduling information of the public warning system message does not change, and the paging message is used by the terminal device to determine, based on the paging message, to receive the public warning system message.

In the foregoing method, the network device sends the paging message to the terminal device, and the terminal device determines, based on the paging message, to receive the public warning system message. Therefore, after receiving the paging message, the terminal device does not need to read a SIB1, does not need to obtain, based on a scheduling list of an SI message in the SIB1, scheduling information of an SI message including the public warning system message, does not need to determine, based on the scheduling information, an SI window location of the SI message carrying public warning system information, and does not need to finally receive the public warning system message at the SI window location. This greatly reduces time for obtaining the public warning system message, and improves a speed of obtaining the public warning system message by the terminal device.

In an optional solution, the network device sends the scheduling information to the terminal device, where the scheduling information is used by the terminal device to receive the public warning system message based on the scheduling information.

A fourth aspect of embodiments of this application discloses a communication method. The method is applicable to a communication apparatus, the communication apparatus is, for example, a network device, and the method includes:

sending a paging message to a terminal device, where the paging message includes first information, the first information is used to indicate a resource location of a public warning system message, and the paging message is used by the terminal device to receive the public warning system message based on the paging message.

In the foregoing method, the network device sends the paging message to the terminal device, and the terminal device receives the paging message, where the paging message includes the first information used to indicate the resource location (a system information window (SI window) location) of the public warning system message; and receives the public warning system message based on the first information, in the foregoing method, the terminal device can quickly obtain the public warning system message. Therefore, after receiving the paging message, the terminal device does not need to read a SIB1, does not need to obtain, based on a scheduling list of an SI message in the SIB1, scheduling information of an SI message including the public warning system message, does not need to determine, based on the scheduling information, the SI window location of the SI message carrying public warning system information, and does not need to finally receive the public warning system message at the SI window location. This greatly improves a speed of obtaining the public warning system message by the terminal device.

In an optional solution, the first information includes the scheduling information and indication information of the public warning system message, and the indication information is used to indicate a sequence number of the scheduling information in a system message scheduling information list.

In the foregoing method, after receiving the paging message, the terminal device may directly determine the resource location (the system information window (SI window) location) of the public warning system message by using the scheduling information and the indication information in the first message, and obtain the public warning system message based on the resource location. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the first information includes downlink control information, and the downlink control information is used to indicate a time-frequency resource location of the public warning system message.

In the foregoing method, after receiving the paging message, the terminal device may directly obtain the public warning system message by using the downlink control information that is in the first information and that is used to indicate the time-frequency resource location of the public warning system message. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the network device sends wake-up indication information to the terminal device, where the wake-up indication information is used to indicate the terminal device to receive the public warning system message.

In the foregoing method, the terminal device monitors the wake-up indication information in a first periodicity, where the wake-up indication information is used to indicate the terminal device to receive the public warning system message, and monitors the paging message in a second periodicity, so that a balance can be achieved between quickly receiving the public warning system message and reducing power consumption of the terminal device.

In another optional solution, the network device sends a first broadcast message to the terminal device, where the first broadcast message includes first periodicity information, and the first periodicity information is used to indicate that a sending periodicity of the wake-up indication information is the first periodicity.

In another optional solution, the network device sends a second broadcast message to the terminal device, where the second broadcast message is used to indicate that the network device supports sending of the wake-up indication information.

A fifth aspect of embodiments of this application discloses a communication apparatus. The communication apparatus may be, for example, a terminal device or a chip in the terminal device, and the apparatus includes:
  a communication unit, configured to receive a paging message from a network device, where the paging message is used to indicate the terminal device to receive a public warning system message, the paging message includes indication information, and the indication information is used to indicate that scheduling information of the public warning system message does not change; and
  a processing unit, configured to determine, based on the paging message, to receive the public warning system message.

In the foregoing apparatus, the terminal device directly receives the paging message, and determines, based on the paging message, to receive the public warning system message. Therefore, after receiving the paging message, the terminal device does not need to read a SIB1, does not need to obtain, based on a scheduling list of an SI message in the SIB1, scheduling information of an SI message including the public warning system message, does not need to determine, based on the scheduling information, an SI window location of the SI message carrying public warning system information, and does not need to finally receive the public warning system message at the SI window location. This greatly reduces time for obtaining the public warning system message, and improves a speed of obtaining the public warning system message by the terminal device.

In an optional solution, the communication unit is further configured to receive the public warning system message based on the scheduling information, where the scheduling information comes from the network device.

A sixth aspect of embodiments of this application discloses a communication apparatus. The communication apparatus may be, for example, a terminal device or a chip in the terminal device, and the apparatus includes:
  a communication unit, configured to receive a paging message from a network device, where the paging message includes first information, and the first information is used to indicate a resource location of a public warning system message, where
  the communication unit is further configured to receive the public warning system message based on the paging message.

In the foregoing apparatus, the terminal device directly receives the paging message, where the paging message includes the first information used to indicate the resource location (a system information window (SI window) location) of the public warning system message; and receives the public warning system message based on the first information. In the foregoing method, the terminal device can quickly obtain the public warning system message. Therefore, after receiving the paging message, the terminal device does not need to read a SIB1, does not need to obtain, based on a scheduling list of an SI message in the SIB1, scheduling information of an SI message including the public warning system message, does not need to determine, based on the scheduling information, an SI window location of the SI message carrying public warning system information, and does not need to finally receive the public warning system message at the SI window location to obtain the public warning system message. This greatly improves a speed of obtaining the public warning system message by the terminal device.

In another optional solution, the first information includes the scheduling information and indication information of the public warning system message, and the indication information is used to indicate a sequence number of the scheduling information in a system message scheduling information list.

In the foregoing apparatus, after receiving the paging message, the terminal device may directly determine the resource location (the system information window (SI window) location) of the public warning system message by using the scheduling information and the indication information in the first message, and obtain the public warning system message based on the resource location. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the first information includes downlink control information, and the downlink control information is used to indicate a time-frequency resource location of the public warning system message.

In the foregoing apparatus, after receiving the paging message, the terminal device may directly obtain the public warning system message by using the downlink control information that is in the first information and that is used to indicate the time-frequency resource location of the public warning system message. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, a processing unit is configured to monitor the paging message on continuous paging occasions.

In another optional solution, the communication unit is further configured to receive wake-up indication information from the network device, where the wake-up indication information is used to indicate the terminal device to receive the public warning system message.

In the foregoing apparatus, the terminal device monitors the wake-up indication information in a first periodicity, where the wake-up indication information is used to indicate the terminal device to receive the public warning system message, and monitors the paging message in a second periodicity, so that a balance can be achieved between quickly receiving the public warning system message and reducing power consumption of the terminal device.

In another optional solution, the communication unit is further configured to receive a first broadcast message from the network device, where the first broadcast message includes first periodicity information, and the first periodicity information is used to indicate that a sending periodicity of the wake-up indication information is the first periodicity.

In another optional solution, the processing unit is further configured to monitor the paging message in the second periodicity, where the paging message is used to indicate that a system message changes or indicate the terminal device to receive a service related to the terminal device, and the second periodicity is greater than the first periodicity.

A seventh aspect of embodiments of this application discloses a communication apparatus. The communication apparatus may be, for example, a network device or a chip in the network device, and the apparatus includes:

a communication unit, configured to send a paging message to a terminal device, where the paging message is used to indicate the terminal device to receive a public warning system message, the paging message includes indication information, the indication information is used to indicate that scheduling information of the public warning system message does not change, and the paging message is used by the terminal device to determine, based on the paging message, to receive the public warning system message.

In the foregoing apparatus, the network device sends the paging message to the terminal device, and the terminal device determines, based on the paging message, to receive the public warning system message. Therefore, after receiving the paging message, the terminal device does not need to read a SIB1, does not need to obtain, based on a scheduling list of an SI message in the SIB1, scheduling information of an SI message including the public warning system message, does not need to determine, based on the scheduling information, an SI window location of the SI message carrying public warning system information, and does not need to finally receive the public warning system message at the SI window location. This improves a speed of obtaining the public warning system message by the terminal device.

In an optional solution, the communication unit is further configured to send the scheduling information to the terminal device, where the scheduling information is used by the terminal device to receive the public warning system message based on the scheduling information.

An eighth aspect of embodiments of this application discloses a communication apparatus. The communication apparatus may be, for example, a network device or a chip in the network device, and the apparatus includes:

a communication unit, configured to send a paging message to a terminal device, where the paging message includes first information, the first information is used to indicate a resource location of a public warning system message, and the paging message is used by the terminal device to receive the public warning system message based on the paging message.

In the foregoing apparatus, the network device sends the paging message to the terminal device, and the terminal device receives the paging message, where the paging message includes the first information used to indicate the resource location (a system information window (SI window) location) of the public warning system message; and receives the public warning system message based on the first information. In the foregoing method, the terminal device can quickly obtain the public warning system message. Therefore, after receiving the paging message, the terminal device does not need to read a SIB1, does not need to obtain, based on a scheduling list of an SI message in the SIB1, scheduling information of an SI message including the public warning system message, does not need to determine, based on the scheduling information, the SI window location of the SI message carrying public warning system information, and does not need to finally receive the public warning system message at the SI window location. This greatly improves a speed of obtaining the public warning system message by the terminal device.

In an optional solution, the first information includes the scheduling information and indication information of the public warning system message, and the indication information is used to indicate a sequence number of the scheduling information in a system message scheduling information list.

In the foregoing apparatus, after receiving the paging message, the terminal device may directly determine the resource location (the system information window (SI window) location) of the public warning system message by using the scheduling information and the indication information in the first message, and obtain the public warning system message based on the resource location. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the first information includes downlink control information, and the downlink control information is used to indicate a time-frequency resource location of the public warning system message.

In the foregoing apparatus, after receiving the paging message, the terminal device may directly obtain the public warning system message by using the downlink control information that is in the first information and that is used to indicate the time-frequency resource location of the public warning system message. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the communication unit is further configured to send wake-up indication information to the terminal device, where the wake-up indication information is used to indicate the terminal device to receive the public warning system message.

In the foregoing apparatus, the terminal device monitors the wake-up indication information in a first periodicity, where the wake-up indication information is used to indicate the terminal device to receive the public warning system message, and monitors the paging message in a second periodicity, so that a balance can be achieved between quickly receiving the public warning system message and reducing power consumption of the terminal device.

In another optional solution, the communication unit is further configured to send a first broadcast message to the terminal device, where the first broadcast message includes first periodicity information, and the first periodicity information is used to indicate that a sending periodicity of the wake-up indication information is the first periodicity.

In another optional solution, the communication unit is further configured to send a second broadcast message to the terminal device, where the second broadcast message is used to indicate that the network device supports sending of the wake-up indication information.

A ninth aspect of embodiments of this application discloses a communication apparatus. The communication apparatus includes a processor, a memory, and a transceiver, the memory is configured to store a computer program, and the processor invokes the computer program to perform the following operations:

receiving a paging message from a network device by using the transceiver, where the paging message is used to indicate a terminal device to receive a public warning system message, the paging message includes indication information, and the indication information is used to indicate that scheduling information of the public warning system message does not change; and determining, based on the paging message, to receive the public warning system message.

In the foregoing device, the terminal device directly receives the paging message, and determines, based on the paging message, to receive the public warning system message. Therefore, after receiving the paging message, the terminal device does not need to read a SIB1, does not need to obtain, based on a scheduling list of an SI message in the SIB1, scheduling information of an SI message including the public warning system message, does not need to determine, based on the scheduling information, an SI window location of the SI message carrying public warning system information, and does not need to finally receive the public warning system message at the SI window location. This improves a speed of obtaining the public warning system message by the terminal device.

In an optional solution, the processor is further configured to receive the public warning system message based on the scheduling information, where the scheduling information comes from the network device.

A tenth aspect of embodiments of this application discloses another communication apparatus. The communication apparatus includes a processor, a memory, and a transceiver, the memory is configured to store a computer program, and the processor invokes the computer program to perform the following operations:

receiving a paging message from a network device by using the transceiver, where the paging message includes first information, and the first information is used to indicate a resource location of a public warning system message; and receiving the public warning system message based on the paging message.

In the foregoing device, a terminal device directly receives the paging message, where the paging message includes the first information used to indicate the resource location (a system information window (SI window) location) of the public warning system message; and receives the public warning system message based on the first information. In the foregoing method, the terminal device can quickly obtain the public warning system message. Therefore, after receiving the paging message, the terminal device does not need to read a SIB1, does not need to obtain, based on a scheduling list of an SI message in the SIB1, scheduling information of an SI message including the public warning system message, does not need to determine, based on the scheduling information, the SI window location of the SI message carrying public warning system information, and does not need to finally receive the public warning system message at the SI window location. This greatly improves a speed of obtaining the public warning system message by the terminal device.

In an optional solution, the first information includes the scheduling information and indication information of the public warning system message, and the indication information is used to indicate a sequence number of the scheduling information in a system message scheduling information list.

In the foregoing device, after receiving the paging message, the terminal device may directly determine the resource location (the system information window (SI window) location) of the public warning system message by using the scheduling information and the indication information in the first message, and obtain the public warning system message based on the resource location. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the first information includes downlink control information, and the downlink control information is used to indicate a time-frequency resource location of the public warning system message.

In the foregoing device, after receiving the paging message, the terminal device may directly obtain the public warning system message by using the downlink control information that is in the first information and that is used to indicate the time-frequency resource location of the public warning system message. Therefore, the terminal device does not need to read the SIB1, does not need to obtain, based on the scheduling list of the SI message in the SIB1, the scheduling information of an SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the processor is further configured to monitor the paging message on continuous paging occasions.

In another optional solution, the processor is further configured to receive wake-up indication information from the network device by using the transceiver, where the wake-up indication information is used to indicate the terminal device to receive the public warning system message.

In the foregoing device, the terminal device monitors the wake-up indication information in a first periodicity, where the wake-up indication information is used to indicate the terminal device to receive the public warning system message, and monitors the paging message in a second periodicity, so that a balance can be achieved between quickly receiving the public warning system message and reducing power consumption of the terminal device.

In another optional solution, the processor is further configured to receive a first broadcast message from the network device by using the transceiver, where the first broadcast message includes first periodicity information, and the first periodicity information is used to indicate that a sending periodicity of the wake-up indication information is the first periodicity.

In another optional solution, the processor is further configured to monitor the paging message in the second periodicity, where the paging message is used to indicate that a system message changes or indicate the terminal device to receive a service related to the terminal device, and the second periodicity is greater than the first periodicity.

An eleventh aspect of embodiments of this application discloses a communication apparatus. The communication apparatus includes a processor, a memory, and a transceiver, the memory is configured to store a computer program, and the processor invokes the computer program to perform the following operation:

sending a paging message to a terminal device by using the transceiver, where the paging message is used to indicate the terminal device to receive a public warning system message, the paging message includes indication information, the indication information is used to indicate that scheduling information of the public warning system message does not change, and the paging message is used by the terminal device to determine, based on the paging message, to receive the public warning system message.

In the foregoing device, the network device sends the paging message to the terminal device, and the terminal device determines, based on the paging message, to receive the public warning system message. Therefore, after receiving the paging message, the terminal device does not need to read a SIB1, does not need to obtain, based on a scheduling list of an SI message in the SIB1, scheduling information of an SI message including the public warning system message, does not need to determine, based on the scheduling information, an SI window location of the SI message carrying public warning system information, and does not need to finally receive the public warning system message at the SI window location. This greatly reduces time for obtaining the public warning system message, and improves a speed of obtaining the public warning system message by the terminal device.

In an optional solution, the processor is further configured to send the scheduling information to the terminal device by using the transceiver, where the scheduling information is used by the terminal device to receive the public warning system message based on the scheduling information.

A twelfth aspect of embodiments of this application discloses another communication apparatus. The communication apparatus includes a processor, a memory, and a transceiver, the memory is configured to store a computer program, and the processor invokes the computer program to perform the following operation:

sending a paging message to a terminal device by using the transceiver, where the paging message includes first information, the first information is used to indicate a resource location of a public warning system message, and the paging message is used by the terminal device to receive the public warning system message based on the paging message.

In the foregoing device, a network device sends the paging message to the terminal device, and the terminal device receives the paging message, where the paging message includes the first information used to indicate the resource location (a system information window (SI window) location) of the public warning system message; and receives the public warning system message based on the first information. In the foregoing method, the terminal device can quickly obtain the public warning system message. Therefore, after receiving the paging message, the terminal device does not need to read a SIB1, does not need to obtain, based on a scheduling list of an SI message in the SIB1, scheduling information of an SI message including the public warning system message, does not need to determine, based on the scheduling information, the SI window location of the SI message carrying public warning system information, and does not need to finally receive the public warning system message at the SI window location. This greatly improves a speed of obtaining the public warning system message by the terminal device.

In an optional solution, the first information includes the scheduling information and indication information of the public warning system message, and the indication information is used to indicate a sequence number of the scheduling information in a system message scheduling information list.

In the foregoing device, after receiving the paging message, the terminal device may directly determine the resource location (the system information window (SI window) location) of the public warning system message by using the scheduling information and the indication information in the first message, and obtain the public warning system message based on the resource location. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the first information includes downlink control information, and the downlink control information is used to indicate a time-frequency resource location of the public warning system message.

In the foregoing device, after receiving the paging message, the terminal device may directly obtain the public warning system message by using the downlink control information that is in the first information and that is used to indicate the time-frequency resource location of the public warning system message. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the processor is further configured to send wake-up indication information to the terminal device by using the transceiver, where the wake-up indication information is used to indicate the terminal device to receive the public warning system message.

In the foregoing device, the terminal device monitors the wake-up indication information in a first periodicity, where the wake-up indication information is used to indicate the terminal device to receive the public warning system message; and monitors the paging message in a second periodicity, so that a balance can be achieved between quickly receiving the public warning system message and reducing power consumption of the terminal device.

In another optional solution, the processor is further configured to send a first broadcast message to the terminal device by using the transceiver, where the first broadcast message includes first periodicity information, and the first periodicity information is used to indicate that a sending periodicity of the wake-up indication information is the first periodicity.

In another optional solution, the processor is further configured to send a second broadcast message to the terminal device by using the transceiver, where the second broadcast message is used to indicate that the network device supports sending of the wake-up indication information.

A thirteenth aspect of embodiments of this application discloses a communication system. The communication system includes a terminal device and a network device, the terminal device may perform the method described in any one of the first aspect, the second aspect, or the optional solutions in any one of the first aspect and the second aspect, and the network device may perform the method described in any one of the third aspect, the fourth aspect, or the optional solutions in any one of the third aspect and the fourth aspect.

A fourteenth aspect of embodiments of this application discloses a chip. The chip includes at least one processor and an interface circuit. Optionally, the chip further includes a memory. The memory, the interface circuit, and the at least one processor are interconnected through a line. The at least one memory stores a computer program. When the computer program is executed by the processor, the method described in any one of the first aspect, the second aspect, the third aspect, the fourth aspect, or the optional solutions described in any one of the first aspect, the second aspect, the third aspect, and the fourth aspect is implemented.

A fifteenth aspect of embodiments of this application discloses a computer-readable storage medium. The computer-storage medium stores a computer program. When the computer program is executed by a processor, the method described in any one of the first aspect, the second aspect, the third aspect, the fourth aspect, or the optional solutions in any one of the first aspect, the second aspect, the third aspect, and the fourth aspect is implemented.

DESCRIPTION OF EMBODIMENTS

Figure 1:
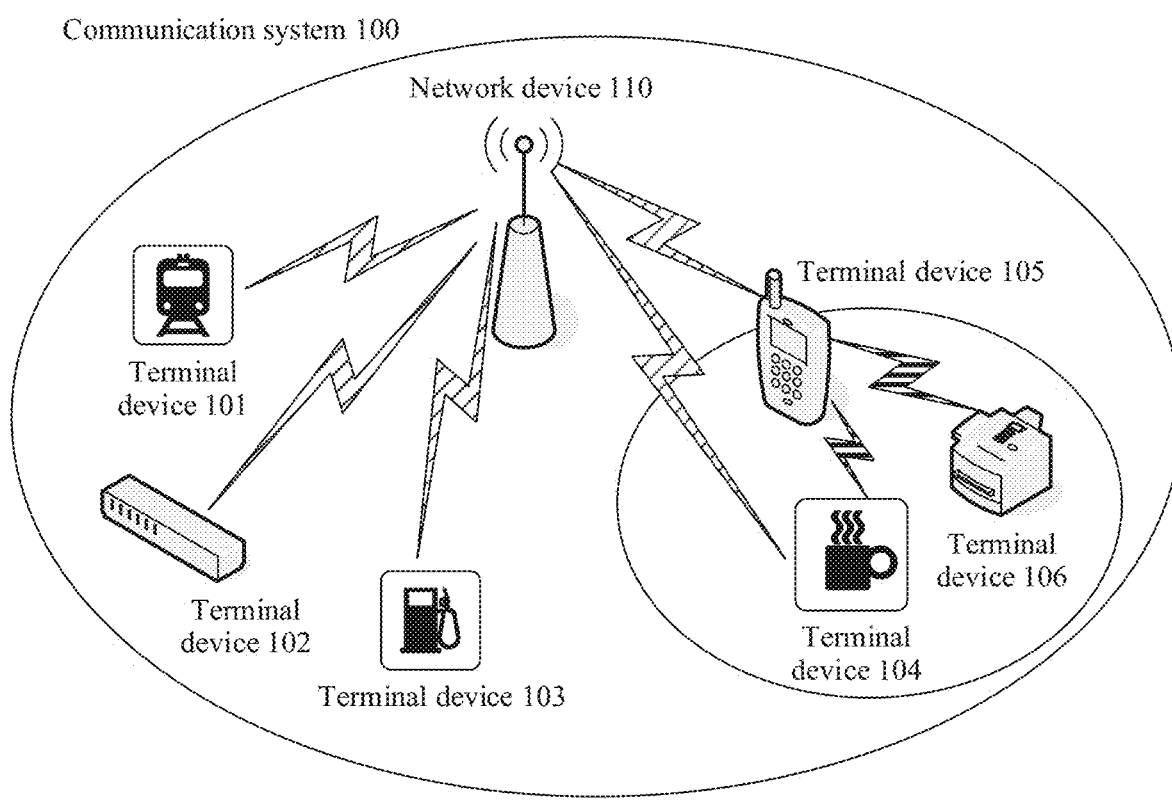
FIG. 1 is a schematic structural diagram of a communication system according to an embodiment of this application.

The following describes embodiments of this application with reference to the accompanying drawings in embodiments of this application.

In the following, some terms of embodiments of this application are described, to help a person skilled in the art have a better understanding.

(1) Terminal device: The terminal device includes a device that provides a voice and/or data connectivity for a user. Specifically, the terminal device includes a device that provides the voice for the user, includes a device that provides the data connectivity for the user, or includes a device that provides the voice and the data connectivity for the user. For example, the terminal device may include a handheld device having a wireless connection function, or a processing device connected to a wireless modem. The terminal device may communicate with a core network through a radio access network (RAN), and exchange a voice or data with the RAN, or exchange the voice and the data with the RAN. The terminal device may include user equipment (UE), a wireless terminal device, a mobile terminal device, a device-to-device (D2D) terminal device, a vehicle-to-everything (V2X) terminal device, a machine-to-machine/machine type communication (M2M/MTC) terminal device, an internet of things (IoT) terminal device, light user equipment (light UE), reduced capability user equipment (reduced capability UE, REDCAP UE), a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a portable, pocket-sized, handheld, or computer built-in mobile apparatus. For example, it may be a device such as a personal communication service (PCS) phone, a cordless telephone set, a session initiation protocol (SIP) phone, a wireless local loop (WU) station, or a personal digital assistant (PDA). The terminal device further includes a limited device, for example, a device with low power consumption, a device with a limited storage capacity, or a device with a limited computing capability. For example, the terminal apparatus includes an information sensing device such as a barcode, radio frequency identification (RFID), a sensor, a global positioning system (GPS), or a laser scanner.

By way of example rather than limitation, in embodiments of this application, the terminal device may alternatively be a wearable device. The wearable device may also be referred to as a wearable intelligent device, an intelligent wearable device, or the like, and is a generic term for wearable devices that are developed by applying a wearable technology to intelligent designs of daily wear, such as glasses, gloves, watches, clothes, and shoes. The wearable device is a portable device that can be directly worn by a user or integrated into clothes or an accessory of the user. The wearable device is not only a hardware device, but also implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and that need to work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (OBU).

In embodiments of this application, the terminal device may further include a relay. Alternatively, it may be understood that any device that can perform data communication with a base station may be considered as a terminal device.

In embodiments of this application, an apparatus configured to implement a function of a terminal device may be a terminal device, or may be an apparatus, for example, a chip system, that can support the terminal device in implementing the function. The apparatus may be installed in the terminal device. In embodiments of this application, the chip system may include a chip, or may include a chip and another discrete component. In the technical solutions provided in embodiments of this application, the technical solutions provided in embodiments of this application are described by using an example in which an apparatus configured to implement a function of a terminal is the terminal device.

(2) Network device: The network device includes, for example, an access network (AN) device such as a base station (for example, an access point), and may be a device that communicates with a wireless terminal device through an air interface by using one or more cells in an access network. Alternatively, the network device is, for example, a road side unit (RSU) in a vehicle-to-everything (V2X) technology. The base station may be configured to mutually convert a received over-the-air frame and an IP packet, and serve as a router between the terminal device and a remaining part of the access network, where the remaining part of the access network may include an IP network. The RSU may be a fixed infrastructure entity supporting V2X application, and may exchange a message with another entity supporting the V2X application. The network device may further coordinate attribute management of the air interface. For example, the network device may include an evolved NodeB (NodeB, eNB, or e-NodeB, evolved Node B) in a long term evolution (LTE) system or a long term evolution-advanced (LTE-A) system, may include a next generation NodeB (gNB) in a 5th generation (5G) mobile communication technology NR system (also briefly referred to as an NR system), or may include a centralized unit (CU) and a distributed unit (DU) in a cloud radio access network (Cloud RAN) system. This is not limited in embodiments of this application.

The network device may further include a core network device. The core network device includes, for example, an access and mobility management function (AMF), a user plane function (UPF), or the like. Because embodiments of this application mainly relate to an access network device, the network device in the following is an access network device unless otherwise specified.

In embodiments of this application, an apparatus configured to implement a function of a network device may be a network device, or may be an apparatus, for example, a chip system, that can support the network device in implementing the function. The apparatus may be installed in the network device. In the technical solutions provided in embodiments of this application, the technical solutions provided in embodiments of this application are described by using an example in which an apparatus configured to implement a function of a network device is the network device.

(3) Radio resource control (RRC) state: The terminal device has three RRC states: an RRC connected state, an RRC idle state, and an RRC inactive state.

The RRC connected state (also briefly referred to as a connected state, where the "connected state" and the "RRC connected state" are a same concept, and the two names are interchangeable in this specification): The terminal device establishes an RRC connection to a network, so that data transmission can be performed.

The RRC idle state (also briefly referred to as an idle state, where the "idle state" and the "RRC idle state" are a same concept, and the two names are interchangeable in this specification): The terminal device does not establish the RRC connection to the network, and the base station does not store a context of the terminal device. If the terminal device needs to enter the RRC connected state from the RRC idle state, the terminal device needs to initiate an RRC connection establishment process.

The RRC inactive state (also briefly referred to as an inactive state, where an "inactivated state", a "deactivated state", the "inactive state", the "RRC inactive state", and an "RRC deactivated state" are a same concept, and these names are interchangeable in this specification): The terminal device previously enters the RRC connected state, and then the base station releases the RRC connection, but the base station stores the context of the terminal device. If the terminal device needs to enter the RRC connected state from the RRC inactive state again, the terminal device needs to initiate an RRC connection resume process (also referred to as an RRC connection reestablishment process). Compared with the RRC connection establishment process, the RRC connection resume process has a shorter latency and smaller signaling overheads. However, the base station needs to store the context of the terminal device, causing storage overheads of the base station.

The foregoing describes some concepts in embodiments of this application. The following describes technical features in embodiments of this application.

In a wireless communication system, for example a 5th generation terrestrial cellular wireless communication system, namely, an NR communication system, information exchanged between a terminal device and a base station is carried through a physical channel. Data sent by the base station, that is, downlink data, is usually carried through a PDSCH; and control information sent by the base station, that is, downlink control information (DCI), is usually carried through a physical downlink control channel (PDCCH). The base station may send a synchronization signal block (SSB). An SSB includes a primary synchronization signal (PSS), a secondary synchronization signal (SSS), and a physical broadcast channel (PBCH). The PSS and the SSS may enable the terminal device to synchronize with the base station, and the PBCH is used to carry a master information block (MIB). The base station may further send a channel state information reference signal (CSI-RS) for the terminal device to perform channel state measurement.

In the NR system, the base station may send a paging message to terminal devices in an RRC idle state, a dormant state, or an RRC inactive state, to initiate paging and transmit data to these terminal devices. Generally, when the base station needs to page the terminal device, the base station sends DCI on one or more POs, to indicate a resource that carries the paging message. The DCI is DCI scrambled by using a paging radio network temporary identifier (P-RNTI). The PO includes a periodic paging search space and a periodic control resource set (CORESET). The terminal device receives/detects/monitors the DCI on the one or more POs in one paging cycle, to receive the paging message, and to determine whether the base station initiates paging to the terminal device. The PO on which the terminal device needs to perform detection is determined through calculation based on an ID of the terminal device according to a predefined rule.

For example, a system frame number (SFN) of a paging frame (PF) including a PO on which the terminal device performs detection in a DRX periodicity, an index of the PO in the PF corresponding to the SFN, and the like may be determined according to the following formulas:

The SFN of the PF satisfies:

$$(SFN + \text{PF\_offset}) \bmod T = \left(\frac{T}{N}\right) * (\text{UE\_ID} \bmod N) \quad \text{(Formula 1)}$$

The index $i_s$ of the PO in the SFN satisfies:

$$i_s = \text{floor}\left(\frac{\text{UE\_ID}}{N}\right) \bmod N_s \quad \text{(Formula 2)}$$

In the foregoing formulas, SEN represents the system frame number of the paging frame, PF_offset represents an offset of the PF, T represents the DRX periodicity, N represents a total quantity of PFs included in one DRX periodicity, $N_s$ represents a quantity of POs included in one PF, mod represents a modulo operation, UE_ID represents a quantity obtained based on the ID of the terminal device, and floor(x) represents rounding x down. $PF_{offset}$, T, N, $N_s$, and the like are all configured by the base station, and UE_ID is determined based on the ID of the terminal device. For example, UE_ID may be the last 10 bits of a 5G-short-temporary mobile subscriber identifier (5G-S-TMSI) of the terminal device. In addition, because the NR system usually has an SSB-based beam sweeping feature, one PO may include s continuous PDCCH detection occasions, where s is a quantity of SSBs actually sent by the base station in a half frame.

It can be learned that in a process in which the terminal device monitors the paging message, a large quantity of blind detections, that is, blind detections of DCI, need to be performed, and a large quantity of data storage and demodulation operations need to be performed. In this case, in this process, high power consumption is caused, and a battery life of the terminal device is shortened. Such a paging mechanism, especially for a machine type communication (MTC) terminal device, is more unfavorable because such a terminal device usually needs to work for 3 to 10 years without replacing a battery. A typical MTC terminal device includes an enhanced machine type communication (enhanced MTC, eMTC) terminal device, a narrowband Internet (narrowband internet of things, NB-IoT) terminal device, or the like.

Therefore, in an LTE system, to reduce power consumption of the terminal device, a WUS is introduced. If the base station needs to page the terminal device on a PO, the base station sends a WUS before the PO. The terminal device may determine, by detecting the WUS, whether to detect the paging message. WUSs of the eMTC terminal device and the NB-IoT terminal device are generated by using a Gold sequence and a ZC sequence, and are cell-level common signals. Because detection of a WUS sequence by the terminal device may be completed by using a simple cross-correlation operation, a process of detecting the WUS by the terminal device is simple, and power consumption brought by the detection is low.

FIG. 1 is a schematic structural diagram of a communication system 100 according to an embodiment of the present disclosure. The communication system 100 may include a network device 110, a terminal device 101, a terminal device 102, a terminal device 103, a terminal device 104, a terminal device 105, and a terminal device 106. It should be understood that the communication system 100 to which a method in embodiments of this application is applicable may include more or fewer network devices or terminal devices. The network device and the terminal device may be hardware, may be software obtained through functional division, or may be a combination thereof. The network device and the terminal device may communicate with each other by using another device or network element. In the communication system, the network device 110 may transmit data with a plurality of terminal devices, that is, the network device 110 sends downlink data to the terminal device 101 to the terminal device 106. Certainly, the terminal device 101 to the terminal device 106 may send uplink data to the network device 110. In addition, the terminal device 104, the terminal device 105, and the terminal device 106 may alternatively form a communication system. In the communication system, the network device 110 may send downlink data to the terminal device 101, the terminal device 102 and the terminal device 105, and then the terminal device 105 sends downlink data to the terminal device 104 or the terminal device 106. The method in embodiments of this application may be applied to the communication system 100 shown in FIG. 1. The network device 110 may be any network device described above as an example. The terminal device 101 to the terminal device 106 may be any terminal device described above as an example.

Terms Included in this Application are Described Below

Paging message: The paging message is used to indicate that system information of a terminal device changes, and public warning system information arrives, or a service related to the terminal device arrives. A terminal device in an RRC idle state or an RRC inactive state needs to periodically detect the paging message, and a detection periodicity is referred to as a paging cycle or a DRX periodicity.

System information message (SI message): All system information blocks other than a system information block type 1 (SIB1) are carried in the SI message. The SIB1 indicates a scheduling information list of the SI message, and mainly includes the following content: (1) a system information block (SIB) type included in each SI message; (2) a periodicity of each SI message; and (3) information indicating whether each SI message is being broadcast. A public warning system message is also a part of the system information message, and a corresponding system information block type varies with different content of the message. For example, in an NR system, earthquake-related warning information is a system information block type 6 (SIB6) and a system information block type 7 (SIB7), and commercial alarm-related warning information is a system information block type 8 (SIB8). However, regardless of a system information block type corresponding to the public warning system message, the public warning system message is carried in the SI message, and is sent to the terminal device by using the SI message.

eDRX periodicity: The terminal device in the RRC idle state or the RRC inactive state needs to periodically detect paging, a maximum periodicity supported by a current protocol, that is, the DRX periodicity, is 2.56 s, and time is short, in addition, the paging message occurs occasionally. As a result, high power consumption is caused for the terminal device. In this case, an eDRX mechanism is introduced, to reduce power consumption of the terminal device by increasing a periodicity in which the terminal device detects the paging message. In the eDRX mechanism, the terminal device applies to a network device for an eDRX periodicity. After the network device performs acknowledgment, the terminal device may periodically detect the paging message in the eDRX periodicity.

Currently, the terminal device obtains, mainly in the following manner, a public warning system message sent by the network device: The terminal device periodically detects the paging message based on the eDRX periodicity; and if the terminal device determines, by using the paging message, that an indication of the public warning system information exists, the terminal device obtains the public warning system information. A specific process is as follows: The terminal device periodically monitors a PDCCH used to schedule the paging message; and if DCI is parsed out from the PDCCH channel by using a P-RNTI, it indicates that the terminal needs to receive the paging message. In an LTE system, the terminal device receives a data block on a related PDSCH by using a parameter indicated by the DCI, to obtain the paging message. If the terminal device determines, by using the paging message, that the indication of the public warning system message exists, the terminal device reads a SIB1 obtains, based on a scheduling list of an SI message in the SIB1, scheduling information of the SI message including the public warning system message, and then determines, based on the scheduling information, a system information window (SI window) location of the SI message carrying the public warning system message. Finally, the terminal device receives the public warning system message at the SI window location. In the NR system, the terminal device determines, based on a short message in the DCI, whether the public warning system message needs to be read. If the short message in the DCI indicates that the public warning system message needs to be read, the terminal device reads the SIB1, obtains, based on the scheduling list of the SI message in the SIB1, the scheduling information of the SI message including the public warning system message, and then determines, based on the scheduling information, the SI window location of the SI message carrying public warning system information. Finally, the terminal device receives the public warning system message at the SI window location.

A calculation method for the terminal device to determine, based on the scheduling information of the SI message carrying the public warning system message, the SI window of the SI message carrying the public warning system message is as follows:

(1) Determine a value of n. n is a sequence of the scheduling information of the SI message carrying the public warning system message in the scheduling information list of the SI message. The value starts from 1. For example, a sequence n of a SIB2 in the scheduling information list of the SI message is 1.

(2) Determine a value of x. $x=(n-1)*w$, where w is a window length of the system information.

(3) Determine a start location of the window A start subframe a (where $a=x \bmod 10$) and a system frame number SFN of the start subframe need to satisfy the following condition: $SFN \bmod T = FLOOR(x/10)$, where T is a periodicity of the SI message.

After the terminal device determines, by using the paging message, that the indication of the public warning system message exists, the terminal device needs to read the SIB1 again, obtains, based on the scheduling list of the SI message in the SIB1, the scheduling information of the SI message including the public warning system message, then determines, based on the scheduling information, the SI window location of the SI message carrying the public warning system information, and finally obtains the public warning system message at the SI window location. A sending periodicity of the SIB1 is from 20 ms to 80 ms, and the terminal device obtains the public warning system message by reading the SIB1 again. This reduces a speed of obtaining the public warning system message by the terminal device.

Therefore, to resolve the foregoing technical problem, embodiments of this application provide the following solutions.

Figure 2:
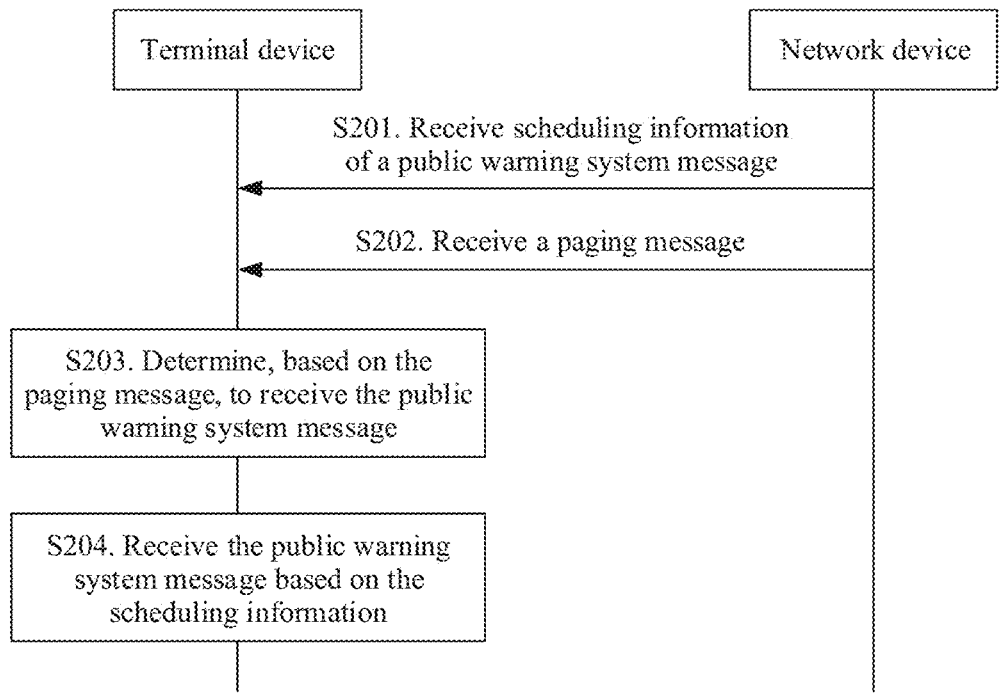
FIG. 2 is a schematic diagram of a communication method according to an embodiment of this application.

FIG. 2 is a schematic diagram of a communication method according to an embodiment of the present disclosure. The method includes but is not limited to the following steps.

Step S201. A terminal device receives scheduling information of a public warning system message from a network device.

The scheduling information of the public warning system message is used to schedule an SI message carrying the public warning system message. Specifically, when the terminal device enters, for the first time, an area covered by the network device, the terminal device receives a SIB1 sent by the network device, determines, based on a scheduling information list of the SI message in the SIB1, scheduling information of the SI message carrying the public warning system message, and determines, based on the scheduling information, an SI window location of the SI message carrying the public warning system message. The scheduling information includes a periodicity length of the system information, a system information block type, and a window length of the system information.

For example, configuration of the SIB1 that is received by the terminal device and that is sent by the network device, that is, the scheduling information list of the SI message, is: The network device sends three SI messages. The first SI message carries only a system information block type 2 (SIB2), a periodicity of the SIB2 is 160 milliseconds, and a window length is 20 milliseconds. The second SI message carries only a system information block type 3 (SIB3), a periodicity of the SIB3 is 320 milliseconds, and a window length is 20 milliseconds. The third. SI message carries only a system information block type 6 (SIB6), a periodicity of the SIB6 is 640 milliseconds, and a window length is 20 milliseconds. The third SI message is the SI message carrying the public warning system message. The terminal device determines an SI window based on the foregoing calculation method for determining, based on the scheduling information of the SI message including the public warning system message, the SI window of the SI message carrying the public warning system message. A specific process is as follows, Because the third SI message is the SI message carrying the public warning system message, n=3. Because the third SI message carries only the SIB6, n=3, the periodicity of the SIB6 is 640 milliseconds, and the window length is 20 milliseconds, x 3−1)*20=40. Because n=3, x=40, a=0, T=640 milliseconds, and x/10=4, window start locations of the third SI message are (4, 0), (68, 0), (132, 0), and (196, 0).

In conclusion, the terminal device determines, based on the scheduling information of the public warning system message, that window locations of the public warning system message are (4, 0), (68, 0), (132, 0), and (196, 0), and then the terminal device stores the window locations of the public warning system message. Alternatively, the terminal device stores the scheduling information of the SI message including the public warning system message. Alternatively, the terminal device stores information used to determine the SI window of the public warning system message.

Step S202. The terminal device receives a paging message sent by the network device.

Specifically, the paging message is used to indicate the terminal device to receive the public warning system message, the paging message includes indication information, and the indication information is used to indicate that the scheduling information of the public warning system message does not change, that is, the scheduling information of the SI message carrying the public warning system message does not change. Optionally, the indication information may be further used to indicate that the original scheduling information is valid. Optionally, the indication information may be further used to indicate that the terminal device may receive the public warning system message based on the original scheduling information. Optionally, the indication information is indicated by using a bit or a field. For example, a reserved bit in the paging message is used to indicate that the scheduling information of the public warning system message does not change.

For example, configuration of the SIB1 that is received by the terminal device and that is sent by the network device, that is, the scheduling information list of the SI message, is: The network device sends three SI messages. The first SI message carries only a SIB2, a periodicity of the SIB2 is 160 milliseconds, and a window length is 20 milliseconds. The second SI message carries only a SIB3, a periodicity of the SIB3 is 320 milliseconds, and a window length is 20 milliseconds. The third SI message carries only a SIB10, a periodicity of the SIB10 is 640 milliseconds, and a window length is 20 milliseconds. The third SI message is the SI message carrying the public warning system message. In this case, the terminal device receives the paging message sent by the network device, where the paging message includes the indication information, and the indication information is used to indicate that the scheduling information of the SI message carrying the public warning system message does not change. That is, the third SI message carries only a SIB7, a periodicity of the SIB7 is 640 milliseconds, and a window length is 20 milliseconds. The scheduling information does not change and is still valid.

Step S203. The terminal device determines, based on the paging message, to receive the public warning system message. The paging message is used to indicate the terminal device to receive the public warning system message.

Step S204. The terminal device receives the public warning system message based on the scheduling information.

Specifically, the paging message that is sent by the network device and that is received by the terminal device includes the indication information, and the indication information is used to indicate that the scheduling information of the public warning system message does not change, that is, the indication information is used to indicate that the scheduling information of the SI message carrying the public warning system message does not change. In this case, the terminal device obtains the previously stored information used to determine the SI window of the public warning system message, determines the SI window location of the public warning system message, and receives the public warning system message at the SI window location.

Specifically, if the paging message that is sent by the network device and that is received by the terminal device includes the indication information, and the indication information is used to indicate that the scheduling information of the public warning system message has changed, that is, the scheduling information of the SI message carrying the public warning system message has changed, the terminal device needs to read the SIB1, obtain, based on the scheduling list of the SI message in the SIB1, the scheduling information of the SI message including the public warning system message, and then determine the SI window based on the scheduling information. Finally, the terminal device receives the public warning system message at the SI window.

For example, because the paging message that is sent by the network device and that is received by the terminal device includes the indication information, and the indication information indicates that the scheduling information of the SI message carrying the public warning system message does not change, the terminal device obtains the previously stored information used to determine the SI window of the public warning system message, and determines that the SI windows are (4, 0), (68, 0), (132, 0), and (196, 0). Then, the terminal device receives the public warning system message at (4, 0), (68, 0), (132, 0), and (196, 0).

In the foregoing method, the terminal device directly receives the paging message, obtains, based on the indication information in the paging message, the previously stored information used to determine the SI window of the public warning system message, determines the SI window, and receives the public warning system message at the SI window. Therefore, after receiving the paging message, the terminal device does not need to receive the SIB1, does not need to obtain, from the scheduling information list of the SI message in the SIB1, the scheduling information of the SI message including the public warning system message, and does not need to determine, based on the scheduling information, the SI window carrying the public warning system message, to obtain the public warning system message. That is, when the scheduling information of the public warning system message does not change, the terminal device does not need to repeatedly read the SIB message. This greatly reduces time for obtaining the public warning system message, and improves a speed of obtaining the public warning system message by the terminal device.

Figure 3:
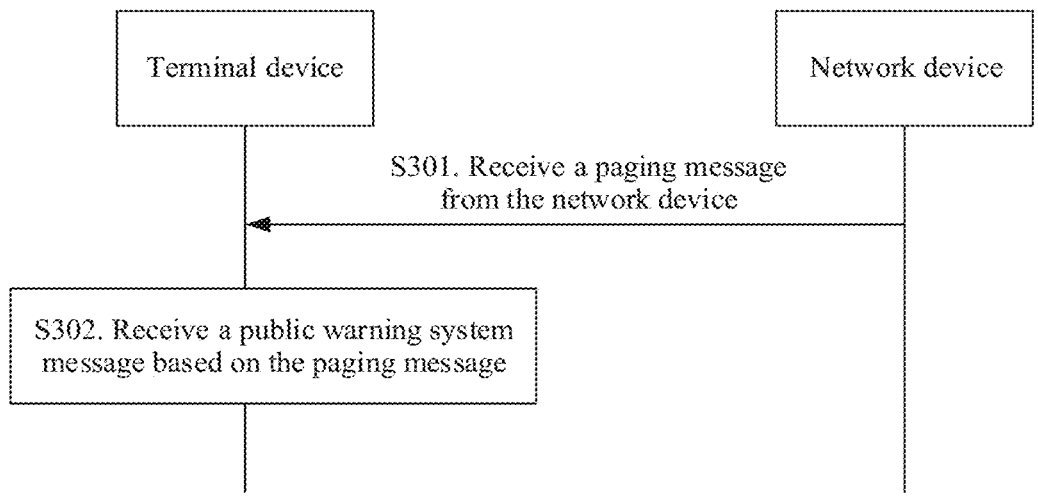
FIG. 3 is a schematic diagram of another communication method according to an embodiment of this application.

FIG. 3 is a schematic diagram of another communication method according to an embodiment of the present disclosure. The method includes but is not limited to the following steps.

Step S301. A terminal device receives a paging message from a network device. The paging message includes first information, and the first information is used to indicate a resource location of a public warning system message, that is, used to indicate a resource location of an SI message carrying the public warning system message.

In an optional solution, the first information includes scheduling information of the public warning system message, that is, scheduling information and indication information of the SI message carrying the public warning system message, and the indication information is used to indicate a sequence number of the scheduling information in a system message scheduling information list.

Specifically, the terminal device may determine an SI window location of the public warning system message based on the scheduling information of the SI message carrying the public warning system message and the sequence number of the scheduling information in the system message scheduling information list, and the terminal device receives the public warning message based on the SI window location.

For example, the scheduling information that is of the SI message carrying the public warning system message and that is included in the first information is that a periodicity of a SIB8 is 640 milliseconds, and a window length is 20 milliseconds. When the sequence number of the scheduling information in the scheduling information list of the SI message is 3, that is, the indication information is 3, the terminal device determines, based on the scheduling information and the indication information, that SI window locations of the public warning system message are (4, 0), (68, 0), (132, 0), and (196, 0). A specific calculation method is described above.

In this solution, after receiving the paging message, the terminal device may directly determine, by using the scheduling information and the indication information in the first message, the SI window location of the SI message carrying the public warning system message, and obtain the public warning system message based on the SI window location. Therefore, the terminal device does not need to read the SIB1, does not need to obtain, based on a scheduling list of an SI message in the SIB1, scheduling information of the SI message including the public warning system message, does not need to determine, based on the scheduling information, an SI window location of the SI message carrying public warning system information, and does not need to finally receive the public warning system message at the SI window location. This greatly improves a speed of obtaining the public warning system message by the terminal device.

In another optional solution, the first information includes downlink control information (DCI), and the downlink control information is used to indicate to send a time-frequency resource location of the public warning system message.

Specifically, the downlink control information may be further used to indicate a modulation and coding scheme, an antenna port, a codebook configuration, and the like of the public warning system message. Because the downlink control information is used to indicate the time-frequency resource location of the public warning system message, the terminal device receives the public warning system message based on the time-frequency resource location of the public warning system message. The DCI may be DCI configured with all parameters, and the DCI configured with all the parameters may be used to indicate the time-frequency resource location of the public warning system message. Alternatively, the DCI may be DCI configured with some parameters, and the DCI configured with the some parameters is used to indicate the time-frequency resource location of the public warning system message.

For example, the terminal device receives the paging message from the network device. The paging message includes the first information, the first information includes the downlink control information, and the downlink control information is used to indicate the time-frequency resource location of the public warning system message. The terminal device receives the public warning system message based on the time-frequency resource location of the public warning system message, until the paging message does not include the downlink control information that is used to indicate the time-frequency resource location or that is indicated by the public warning system message.

In this solution, after receiving the paging message, the terminal device may directly obtain the public warning system message by using the downlink control information in the first information. The downlink control information is used to indicate the time-frequency resource location of the public warning system message. Therefore, the terminal device does not need to read the SIB1, does not need to obtain, based on the scheduling list of the SI message in the SIB1, the scheduling information of the SI message including the public warning system message, does not need to determine, based on the scheduling information, the SI window location of the SI message carrying the public warning system information, and does not need to finally receive the public warning system message at the SI window location. This greatly improves the speed of obtaining the public warning system message by the terminal device.

In another optional solution, the terminal device monitors the paging message on continuous paging occasions.

Specifically, the continuous paging occasions are continuous POs in a paging frame, and the PO may be a PO determined based on an ID of the terminal device, or may be a PO determined based on an ID of another terminal device. To reduce power consumption of a terminal device in an RRC idle state, the terminal device receives the paging message in a discontinuous reception manner. The terminal device in the RRC idle state monitors a PDCCH in a specific subframe, and the specific subframe is referred to as a paging occasion PO. The PO on which the terminal device needs to perform monitoring is determined through calculation based on the ID of the terminal device according to a predefined rule, that is, determining of the PO is related to the ID of the terminal device, that is, UE_ID. Therefore, after determining the PO of the terminal device, the terminal device starts to monitor the PDCCH on the first PO of the terminal device. If the paging message includes the ID of the terminal device, a paging response is initiated. Then, the terminal device monitors the PDCCH on a PO next to the first PO in the paging frame. The PO next to the first PO may be a PO determined by another terminal device based on an ID of the another terminal device or a PO determined by the terminal device based on the ID of the terminal device. A purpose of monitoring the paging message by the terminal device on the continuous paging occasions is to receive the complete public warning system message because each segment of the downlink control information may indicate time-frequency resource locations of different segments of the public warning system message.

Figure 4:
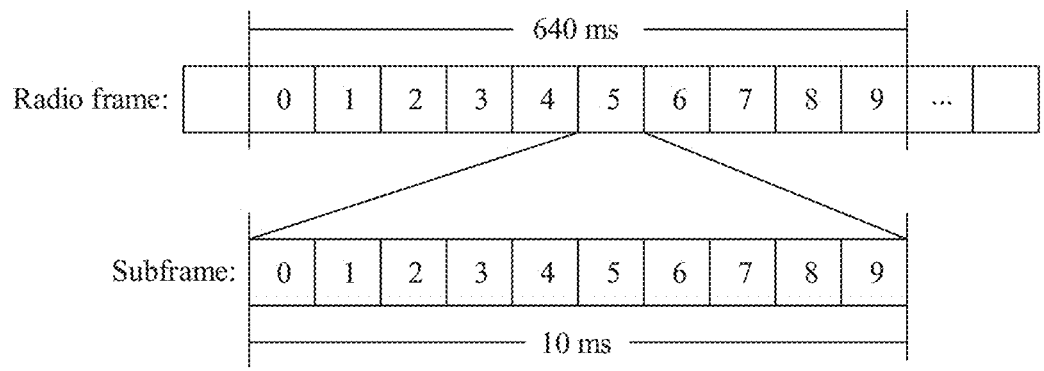
FIG. 4 is a schematic diagram in which a terminal device monitors a paging message on continuous paging occasions according to an embodiment of this application.

For example, FIG. 4 is a schematic diagram in which the terminal device monitors the paging message on the continuous paging occasions. If the terminal device determines, based on the ID of the terminal device, that the paging occasions of the terminal device are a subframe 4 and a subframe 9, and a subframe 6 is a paging occasion of another terminal device, the terminal device monitors the paging message in the subframe 4, then the terminal device monitors the paging message in the subframe 6, and finally the terminal device monitors the paging message in the subframe 9.

In another optional solution, the terminal device receives a second broadcast message from the network device, where the second broadcast message is used to indicate whether the network device supports indicating, by using wake-up indication information, arrival of the public warning system message.

In the first case, if the second broadcast message indicates that the network device supports indicating, by using wake-up indication information, the arrival of the public warning system message, the terminal device receives a first broadcast message from the network device, where the first broadcast message includes first periodicity information, and the first periodicity information is used to indicate that a sending periodicity of the wake-up indication information is a first periodicity. After the terminal device obtains the first periodicity, the terminal device monitors the wake-up indication information in the first periodicity, and the terminal device monitors the paging message in a second periodicity, where the paging message is used to indicate that a system message changes or indicate the terminal device to receive a service related to the terminal device. If the terminal device detects the wake-up indication information, the terminal device receives the wake-up indication information from the network device, where the wake-up indication information is used to indicate the terminal device to receive the public warning system message. Optionally, the second periodicity is greater than the first periodicity.

In the second case, if the second broadcast message indicates that the network device does not support indicating, by using the wake-up indication information, the arrival of the public warning system message, the terminal device monitors the paging message in a second periodicity, where the paging message is used to indicate the terminal device to receive the public warning system message, indicate that a system message changes, or indicate the terminal device to receive a service related to the terminal device. Because the network device does not support indicating, by using the wake-up indication information, the arrival of the public warning system message, the terminal device does not support monitoring the wake-up indication information in the first periodicity, and does not support receiving the wake-up indication information from the network device.

It should be noted that the wake-up indication information may alternatively be a message that is similar to the wake-up indication information but is not limited to the wake-up indication information.

For example, if the first periodicity in the first periodicity information in the first broadcast message is 1 second, and the second periodicity is 3 seconds, it indicates that the sending periodicity of the wake-up indication information is the first periodicity, that is, second. The terminal device monitors the wake-up indication information once at an interval of 1 second. The wake-up indication information is used to indicate the terminal device to receive the public warning system message. If there is no wake-up indication information, the terminal device monitors the paging message at an interval of 3 seconds. The paging message is used to indicate that the system message changes or indicate the terminal device to receive the service related to the terminal device.

In this solution, the terminal device monitors the wake-up indication information in the first periodicity, where the wake-up indication information is used to indicate the terminal device to receive the public warning system message; and monitors the paging message in the second periodicity, so that a balance can be achieved between quickly receiving the public warning system message and reducing power consumption of the terminal device.

Step S302. The terminal device receives the public warning system message based on the paging message.

Specifically, the paging message includes the first information. If the first information includes the scheduling information and the indication information of the SI message carrying the public warning system message, and the indication information is used to indicate the sequence number of the scheduling information of the SI message carrying the public warning system message in the system message scheduling information list, the terminal device may determine, based on the scheduling information and the sequence number of the scheduling information in the system message scheduling information list, the SI window location of the SI message carrying the public warning system message, and the terminal device receives the public warning message at the SI window location. If the first information includes the downlink control information, because the downlink control information is used to indicate the time-frequency resource location of the public warning system message, the terminal device receives the public warning system message at the time-frequency resource location of the public warning system message.

Figure 5:
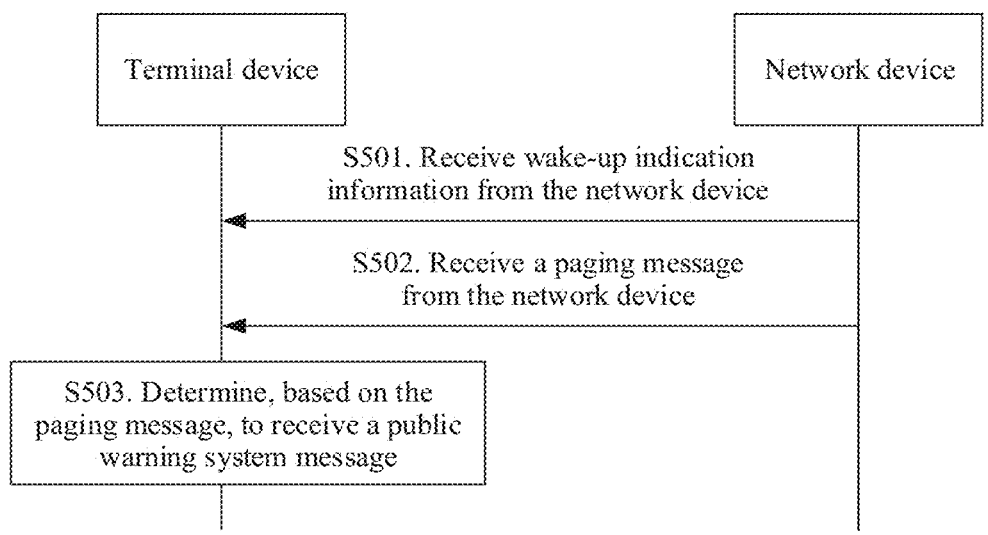
FIG. 5 is a schematic diagram of another communication method according to an embodiment of this application.

FIG. 5 is a schematic diagram of another communication method according to an embodiment of the present disclosure. The method includes but is not limited to the following steps.

Step S501. A terminal device receives wake-up indication information from a network device. The wake-up indication information is used to indicate the terminal device to receive public warning information.

Step S502. The terminal device receives a paging message from the network device. The paging message includes indication information, and the indication information is used to indicate that scheduling information of the public warning system message does not change, that is, scheduling information of an SI message carrying the public warning system message does not change.

Step S503. The terminal device determines, based on the paging message, to receive the public warning system message.

Specifically, the wake-up indication information is used to indicate the terminal device to receive the public warning information, and the paging message is used to indicate that a system message changes or is used to indicate the terminal device to receive a service related to the terminal device.

For example, if the terminal device receives the wake-up indication information sent by the network device, it indicates that the public warning system message arrives. The terminal device receives the paging message from the network device. Because the paging message includes the indication information, and the indication information indicates that the scheduling information of the SI message carrying the public warning system message does not change, the terminal device reads previously stored information used to determine a window location of the public warning system message, and then the terminal device receives the public warning system message at the window location.

In this solution, in a process in which the terminal device monitors the paging message, a large quantity of blind detections, that is, blind detections of DCI, need to be performed, and a large quantity of data storage and demodulation operations need to be performed. In this case, in this process, high power consumption is caused, and a battery life of the terminal device is shortened. To reduce power consumption of the terminal device, the wake-up indication information is introduced. If the network device needs to page the terminal device on a PO, the network device sends the wake-up indication information before the PO. The terminal device may determine, by detecting the wake-up indication information, whether to detect the paging message, and the terminal device may detect the wake-up indication information by using a simple cross-correlation operation. Therefore, the terminal device can achieve a balance between quickly receiving the public warning system message and reducing the power consumption of the terminal device.

Figure 6:
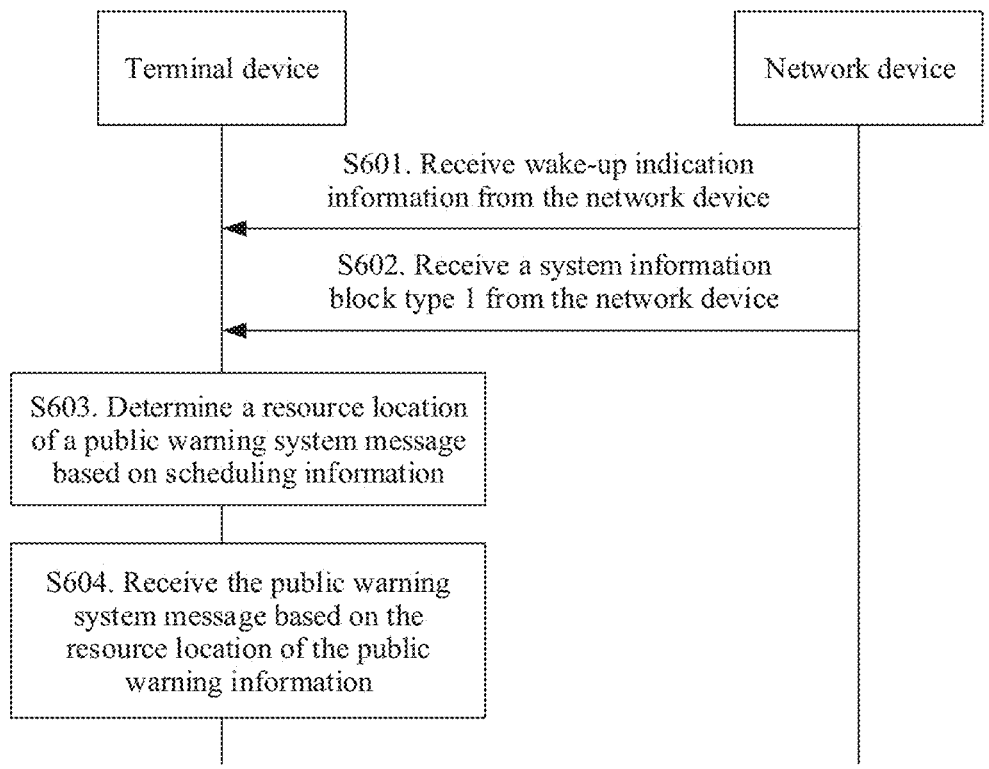
FIG. 6 is a schematic diagram of another communication method according to an embodiment of this application.

FIG. 6 is a schematic diagram of another communication method according to an embodiment of the present disclosure. The method includes but is not limited to the following steps.

Step S601. A terminal device receives wake-up indication information from a network device. The wake-up indication information is used to indicate the terminal device to receive public warning information.

Step S602. The terminal device receives a system information block type 1 sent by the network device, where the system information block type 1 includes scheduling information of the public warning information.

For example, configuration of the system information block type 1 that is received by the terminal device and that is sent by the network device, that is, a scheduling information list of an SI message, is: The network device sends three SI messages. The first SI message carries only a system information block type 2 (SIB2), a periodicity of the SIB2 is 160 milliseconds, and a window length is 20 milliseconds. The second SI message carries only a system information block type 3 (SIB3), a periodicity of the SIB3 is 320 milliseconds, and a window length is 20 milliseconds. The third SI message carries only a system information block type 7 (SIB7), a periodicity of the SIB7 is 640 milliseconds, and a window length is 20 milliseconds. The third SI message is an SI message carrying the public warning system message.

Step S603. The terminal device determines a resource location of the public warning system message based on the scheduling information. A specific calculation method is described above.

Step S604. The terminal device receives the public warning system message based on the resource location of the public warning information.

In this solution, in a process in which the terminal device monitors the paging message, a large quantity of blind detections, that is, blind detections of DCI, need to be performed, and a large quantity of data storage and demodulation operations need to be performed. In this case, in this process, high power consumption is caused, and a battery life of the terminal device is shortened. To reduce power consumption of the terminal device, the wake-up indication information is introduced. If the network device needs to page the terminal device on a PO, the network device sends the wake-up indication information before the PO. The terminal device may determine, by detecting the wake-up indication information, whether to detect the paging message, and the terminal device may detect the wake-up indication information by using a simple cross-correlation operation. Therefore, the terminal device can achieve a balance between quickly receiving the public warning system message and reducing the power consumption of the terminal device.

The foregoing describes in detail the methods in the embodiments of this application. The following provides apparatuses in the embodiments of this application.

Figure 7:
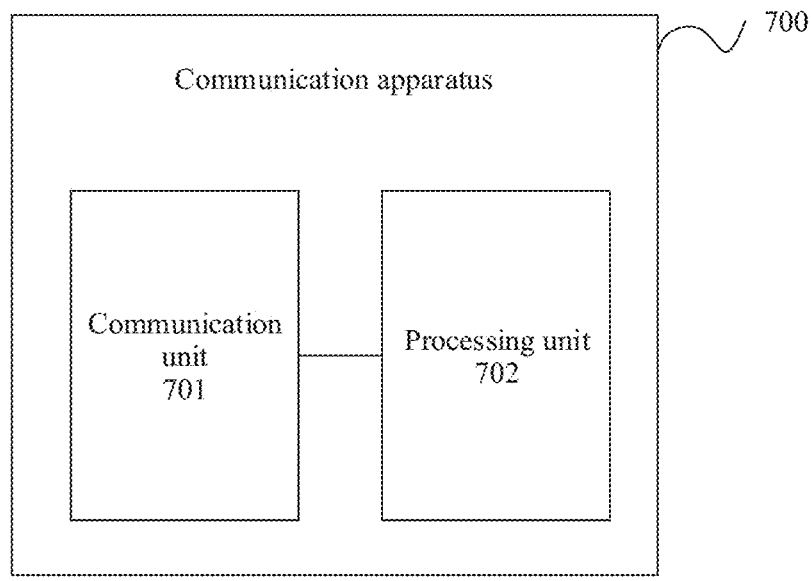
FIG. 7 is a schematic diagram of a communication apparatus according to an embodiment of this application.

FIG. 7 is a schematic structural diagram of a communication apparatus 700 according to an embodiment of this application. The communication apparatus may be the foregoing terminal device, or a component in the terminal device. The communication apparatus 700 may include a communication unit 701 and a processing unit 702. Detailed descriptions of the units are as follows.

The communication unit 701 is configured to receive a paging message from a network device, where the paging message is used to indicate the terminal device to receive a public warning system message, the paging message includes indication information, and the indication information is used to indicate that scheduling information of the public warning system message does not change.

The processing unit 702 is configured to determine, based on the paging message, to receive the public warning system message.

In an optional solution, the communication unit 701 is further configured to receive the public warning system message based on the scheduling information, where the scheduling information comes from the network device.

It should be noted that, for implementations and beneficial effects of the units, refer to corresponding descriptions in the method embodiment shown in FIG. 2.

Figure 8:
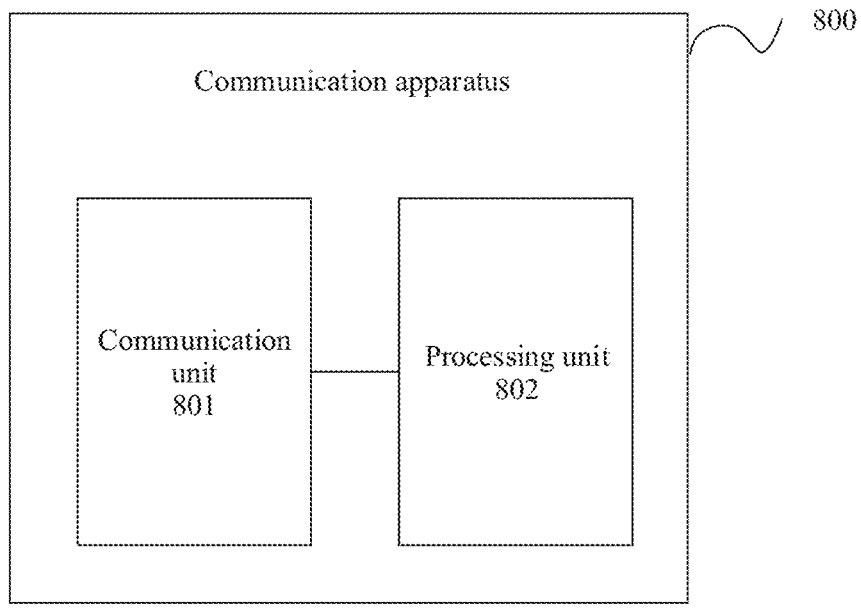
FIG. 8 is a schematic diagram of another communication apparatus according to an embodiment of this application.

FIG. 8 is a schematic structural diagram of another communication apparatus 800 according to an embodiment of this application. The communication apparatus may be the foregoing terminal device, or a component in the terminal device. The communication apparatus 800 may include a communication unit 801 and a processing unit 802. Detailed descriptions of the units are as follows.

The communication unit 801 is configured to receive a paging message from a network device, where the paging message includes first information, and the first information is used to indicate a resource location of a public warning system message.

The communication unit 801 is further configured to receive the public warning system message based on the paging message.

In an optional solution, the first information includes scheduling information and indication information of the public warning system message, and the indication information is used to indicate a sequence number of the scheduling information in a system message scheduling information list.

In another optional solution, the first information includes downlink control information, and the downlink control information is used to indicate a time-frequency resource location of the public warning system message.

In another optional solution, the processing unit 802 is configured to monitor the paging message on continuous paging occasions.

In another optional solution, the communication unit 801 is further configured to receive wake-up indication information from the network device, where the wake-up indication information is used to indicate the terminal device to receive the public warning system message.

In another optional solution, the communication unit 801 is further configured to receive a first broadcast message from the network device, where the first broadcast message includes first periodicity information, and the first periodicity information is used to indicate that a sending periodicity of the wake-up indication information is a first periodicity.

In another optional solution, the processing unit 802 is further configured to monitor the paging message in a second periodicity, where the paging message is used to indicate that a system message changes or indicate the terminal device to receive a service related to the terminal device, and the second periodicity is greater than the first periodicity.

It should be noted that, for implementations and beneficial effects of the units, refer to corresponding descriptions in the method embodiment shown in FIG. 3.

Figure 9:
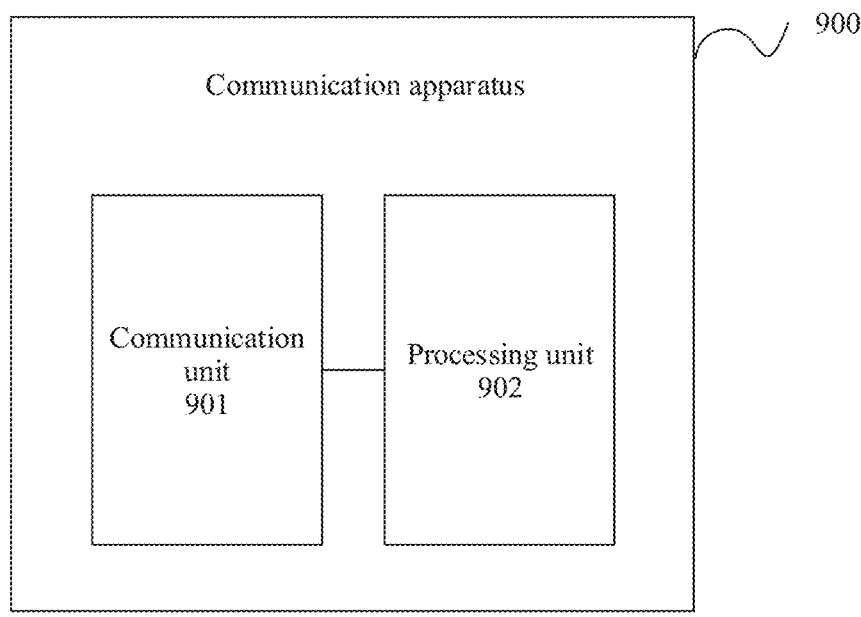
FIG. 9 is a schematic diagram of another communication apparatus according to an embodiment of this application.

FIG. 9 is a schematic structural diagram of another communication apparatus 900 according to an embodiment of this application. The communication apparatus may be the foregoing network device, or a component in the network device. The communication apparatus 900 may include a communication unit 901 and a processing unit 902. Detailed descriptions of the units are as follows.

The processing unit 902 is configured to send a paging message to a terminal device by using the communication unit 901, where the paging message is used to indicate the terminal device to receive a public warning system message, the paging message includes indication information, the indication information is used to indicate that scheduling information of the public warning system message does not change, and the paging message is used by the terminal device to determine, based on the paging message, to receive the public warning system message.

In an optional solution, the processing unit 902 is further used by the communication unit 901 to send the scheduling information to the terminal device, where the scheduling information is used by the terminal device to receive the public warning system message based on the scheduling information.

It should be noted that, for implementations and beneficial effects of the units, refer to corresponding descriptions in the method embodiment shown in FIG. 2.

Figure 10:
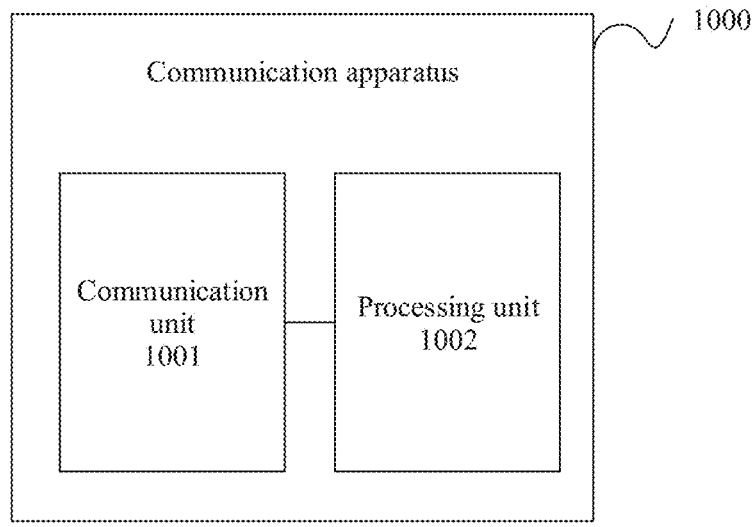
FIG. 10 is a schematic diagram of another communication apparatus according to an embodiment of this application.

FIG. 10 is a schematic structural diagram of another communication apparatus 1000 according to an embodiment of this application. The communication apparatus may be the foregoing network device, or a component in the network device. The communication apparatus 1000 may include a communication unit 1001 and a processing unit 1002. Detailed descriptions of the units are as follows.

The processing unit 1002 is configured to send a paging message to a terminal device by using the communication unit 1001, where the paging message includes first information, the first information is used to indicate a resource location of a public warning system message, and the paging message is used by the terminal device to receive the public warning system message based on the paging message.

In an optional solution, the first information includes scheduling information and indication information of the public warning system message, and the indication information is used to indicate a sequence number of the scheduling information in a system message scheduling information list.

In another optional solution, the first information includes downlink control information, and the downlink control information is used to indicate a time-frequency resource location of the public warning system message.

In another optional solution, the processing unit 1002 is further configured to send wake-up indication information to the terminal device by using the communication unit 1001, where the wake-up indication information is used to indicate the terminal device to receive the public warning system message.

In another optional solution, the processing unit 1002 is further configured to send a first broadcast message to the terminal device by using the communication unit 1001, where the first broadcast message includes first periodicity information, and the first periodicity information is used to indicate that a sending periodicity of the wake-up indication information is a first periodicity.

In another optional solution, the processing unit 1002 is further configured to send a second broadcast message to the terminal device by using the communication unit 1001, where the second broadcast message is used to indicate that the network device supports sending of the wake-up indication information.

It should be noted that, for implementations and beneficial effects of the units, refer to corresponding descriptions in the method embodiment shown in FIG. 3.

Figure 11:
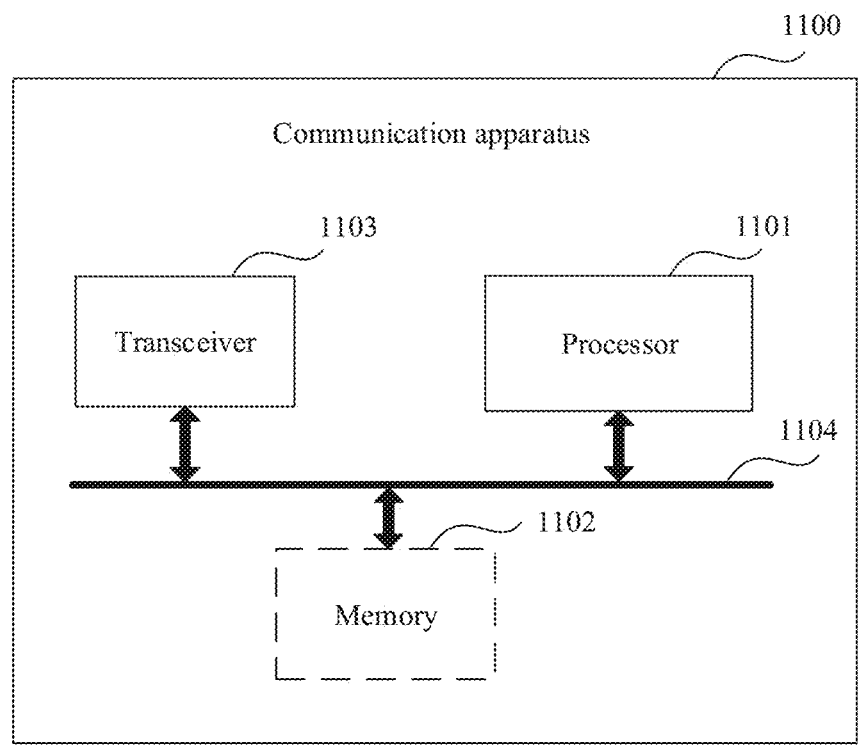
FIG. 11 is a schematic structural diagram of a communication apparatus according to an embodiment of this application.

FIG. 11 shows a communication apparatus 1100 according to an embodiment of this application. The communication apparatus 1100 includes a processor 1101 and a transceiver 1103. Optionally, the communication apparatus 1100 further includes a memory 1102. The processor 1101, the memory 1102, and the transceiver 1103 are connected to each other through a bus 1104.

The memory 1102 includes, but is not limited to, a random access memory (RAM), a read-only memory (ROM), an erasable programmable read-only memory (EPROM), or a compact disc read-only memory (CD-ROM). The memory 402 is configured to store a computer program and data. The transceiver 1103 is configured to receive and send the data.

The processor 1101 may be one or more central processing units (CPUs). When the processor 1101 is one CPU, the CPU may be a single-core CPU or a multi-core CPU.

The processor 1101 in the device 1100 is configured to read the computer program stored in the memory 1102, to perform the following operations:
   receiving a paging message from a network device by using the transceiver 1103, where the paging message is used to indicate a terminal device to receive a public warning system message, the paging message includes indication information, and the indication information is used to indicate that scheduling information of the public warning system message does not change and
   determining, based on the paging message, to receive the public warning system message.

In an optional solution, the processor 1101 is further configured to receive the public warning system message based on the scheduling information, where the scheduling information comes from the network device.

It should be noted that, for implementations and beneficial effects of the units, refer to corresponding descriptions in the method embodiment shown in FIG. 2.

Figure 12:
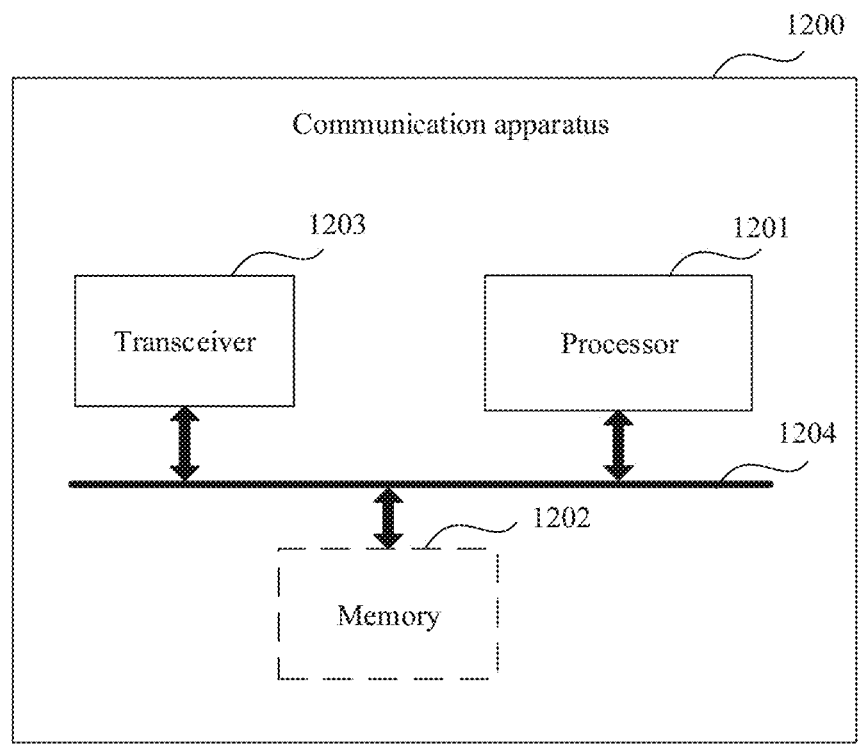
FIG. 12 is a schematic structural diagram of another communication apparatus according to an embodiment of this application.

FIG. 12 shows a communication apparatus 1200 according to an embodiment of this application. The communication apparatus 1200 includes a processor 1201 and a transceiver 1203. Optionally, the communication apparatus 1200 further includes a memory 1202. The processor 1201, the memory 1202, and the transceiver 1203 are connected to each other through a bus 1204.

The memory 1202 includes, but is not limited to, a random access memory (RAM), a read-only memory (ROM), an erasable programmable read-only memory (EPROM), or a compact disc read-only memory (CD-ROM). The memory 402 is configured to store a computer program and data. The transceiver 1203 is configured to receive and send the data.

The processor 1201 may be one or more central processing units (CPUs). When the processor 1201 is one CPU, the CPU may be a single-core CPU or a multi-core CPU.

The processor 1201 in the device 1200 is configured to read the computer program stored in the memory 1202, to perform the following operations:
   receiving a paging message from a network device by using the transceiver 1203, where the paging message includes first information, and the first information is used to indicate a resource location of a public warning system message; and
   receiving the public warning system message based on the paging message.

In an optional solution, the first information includes scheduling information and indication information of the public warning system message, and the indication information is used to indicate a sequence number of the scheduling information in a system message scheduling information list.

In another optional solution, the first information includes downlink control information, and the downlink control information is used to indicate a time-frequency resource location of the public warning system message.

In another optional solution, the processor 1201 is further configured to monitor the paging message on continuous paging occasions.

In another optional solution, the processor 1201 is further configured to receive wake-up indication information from the network device by using the transceiver 1203, where the wake-up indication information is used to indicate a terminal device to receive the public warning system message.

In another optional solution, the processor 1201 is further configured to receive a first broadcast message from the network device by using the transceiver 1203, where the first broadcast message includes first periodicity information, and the first periodicity information is used to indicate that a sending periodicity of the wake-up indication information is a first periodicity.

In another optional solution, the processor 1201 is further configured to monitor the paging message in a second periodicity, where the paging message is used to indicate that a system message changes or indicate the terminal device to receive a service related to the terminal device, and the second periodicity is greater than the first periodicity.

It should be noted that, for implementations and beneficial effects of the units, refer to corresponding descriptions in the method embodiment shown in FIG. 3.

Figure 13:
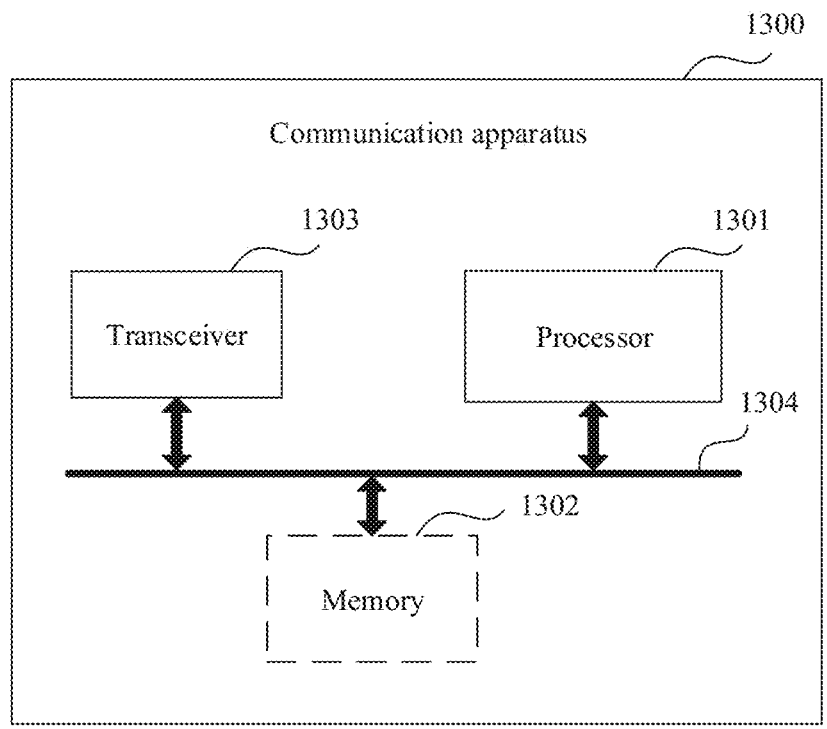
FIG. 13 is a schematic structural diagram of another communication apparatus according to an embodiment of this application.

FIG. 13 shows a communication apparatus 1300 according to an embodiment of this application. The communication apparatus 1300 includes a processor 1301 and a transceiver 1303. Optionally, the communication apparatus 1300 further includes a memory 1302. The processor 1301, the memory 1302, and the transceiver 1303 are connected to each other through a bus 1304.

The memory 1302 includes, but is not limited to, a random access memory (RAM), a read-only memory (ROM), an erasable programmable read-only memory (EPROM), or a compact disc read-only memory (CD-ROM). The memory 402 is configured to store a computer program and data. The transceiver 1303 is configured to receive and send the data.

The processor 1301 may be one or more central processing units (CPUs). When the processor 1301 is one CPU, the CPU may be a single-core CPU or a multi-core CPU.

The processor 1301 in the device 1300 is configured to read the computer program stored in the memory 1302, to perform the following operation:
   sending a paging message to a terminal device by using the transceiver 1303, where the paging message is used to indicate the terminal device to receive a public warning system message, the paging message includes indication information, the indication information is used to indicate that scheduling information of the public warning system message does not change, and the paging message is used by the terminal device to determine, based on the paging message, to receive the public warning system message.

In an optional solution, the processor 1301 is further configured to send the scheduling information to the terminal device by using the transceiver, where the scheduling information is used by the terminal device to receive the public warning system message based on the scheduling information.

It should be noted that, for implementations and beneficial effects of the units, refer to corresponding descriptions in the method embodiment shown in FIG. 2.

Figure 14:
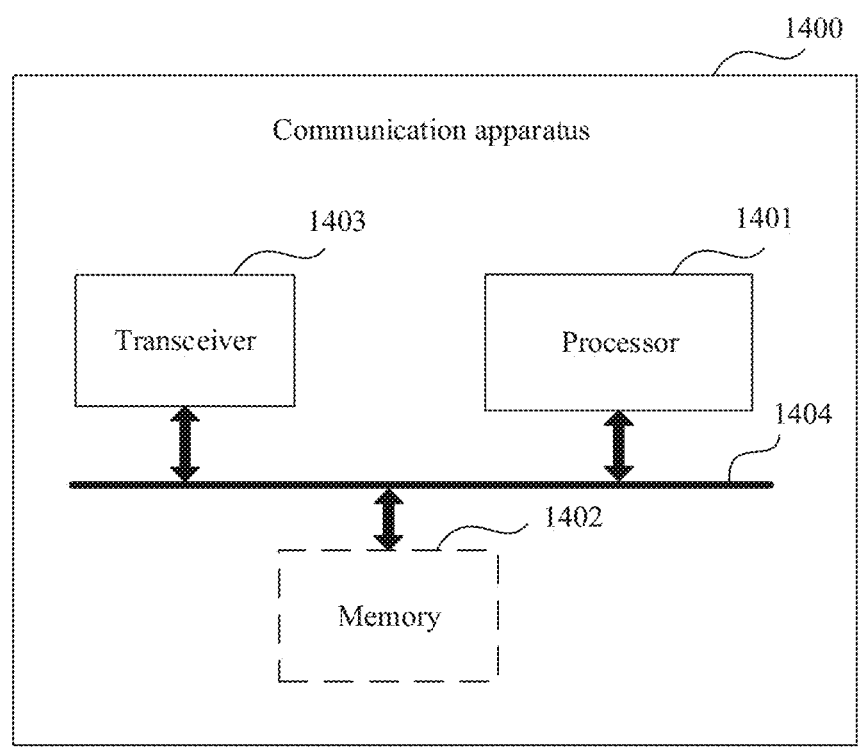
FIG. 14 is a schematic structural diagram of another communication apparatus according to an embodiment of this application.

FIG. 14 shows a communication apparatus 1400 according to an embodiment of this application. The communication apparatus 1400 includes a processor 1401 and a transceiver 1403. Optionally, the communication apparatus 1400 further includes a memory 1402. The processor 1401, the memory 1402, and the transceiver 1403 are connected to each other through a bus 1404.

The memory 1402 includes, but is not limited to, a random access memory (RAM), a read-only memory (ROM), an erasable programmable read-only memory (EPROM), or a compact disc read-only memory (CD-ROM). The memory 402 is configured to store a computer program and data. The transceiver 1403 is configured to receive and send the data.

The processor 1401 may be one or more central processing units (CPUs). When the processor 1401 is one CPU, the CPU may be a single-core CPU or a multi-core CPU.

The processor 1401 in the device 1400 is configured to read the computer program stored in the memory 1402, to perform the following operation:

sending a paging message to a terminal device by using the transceiver 1403, where the paging message includes first information, the first information is used to indicate a resource location of a public warning system message, and the paging message is used by the terminal device to receive the public warning system message based on the paging message.

In an optional solution, the first information includes scheduling information and indication information of the public warning system message, and the indication information is used to indicate a sequence number of the scheduling information in a system message scheduling information list.

In another optional solution, the first information includes downlink control information, and the downlink control information is used to indicate a time-frequency resource location of the public warning system message.

In another optional solution, the processor 1401 is further configured to send wake-up indication information to the terminal device by using the transceiver 1403, where the wake-up indication information is used to indicate the terminal device to receive the public warning system message.

In another optional solution, the processor 1401 is further configured to send a first broadcast message to the terminal device by using the transceiver 1403, where the first broadcast message includes first periodicity information, and the first periodicity information is used to indicate that a sending periodicity of the wake-up indication information is a first periodicity.

In another optional solution, the processor 1401 is further configured to send a second broadcast message to the terminal device by using the transceiver 1403, where the second broadcast message is used to indicate that a network device supports sending of the wake-up indication information.

It should be noted that, for implementations and beneficial effects of the units, refer to corresponding descriptions in the method embodiment shown in FIG. 2.

An embodiment of this application further provides a chip system, where the chip system includes at least one processor, a memory, and an interface circuit. The memory, the transceiver, and the at least one processor are interconnected through a line. The at least one memory stores a computer program. When the computer program is executed by the processor, the method procedure shown in FIG. 2 or FIG. 3 is implemented.

An embodiment of this application further provides a computer-readable storage medium, where the computer-readable storage medium stores instructions. When the instructions are run on a network device or a terminal device, the method procedure shown in FIG. 2 or FIG. 3 is implemented.

An embodiment of this application further provides a computer program product. When the computer program product runs on a terminal device or a network device, the method procedure shown in FIG. 2 or FIG. 3 is implemented.

A person of ordinary skill in the art may understand that all or some of the procedures of the methods in embodiments may be implemented by a computer program instructing relevant hardware. The program may be stored in a computer-readable storage medium. When the program runs, the procedures of the methods in embodiments are performed. The foregoing storage medium includes: any medium that can store program code, such as a ROM, a random access memory RAM, a magnetic disk, or an optical disc.

What is claimed is:

1. A communication method, wherein the method comprises:
   receiving a paging message from a network device, wherein the paging message comprises first information used to indicate a resource location of a public warning system message, and wherein the resource location of the public warning system message comprises (1) a system information (SI) window location of the public warning system message or (2) a time-frequency resource location of the public warning system message; and
   receiving the public warning system message based on the paging message, wherein receiving the public warning system message based on the paging message comprises:
   receiving the public warning system message based on (1) a system information (SI) window location of the public warning system message or (2) a time-frequency resource location of the public warning system message.

2. The method according to claim 1, wherein:
   the first information comprises scheduling information and indication information of the public warning system message, and the indication information is used to indicate a sequence number of the scheduling information in a system message scheduling information list.

3. The method according to claim 1, wherein:
   the first information comprises downlink control information used to indicate the time-frequency resource location of the public warning system message.

4. The method according to claim 3, wherein the method further comprises:
   monitoring the paging message on continuous paging occasions.

5. The method according to claim 1, wherein the method further comprises:
   receiving wake-up indication information from the network device, wherein the wake-up indication information is used to indicate a terminal device to receive the public warning system message.

6. The method according to claim 5, wherein the method further comprises:
   receiving a first broadcast message from the network device, wherein the first broadcast message comprises first periodicity information, and the first periodicity information is used to indicate that a sending periodicity of the wake-up indication information is a first periodicity.

7. The method according to claim 6, wherein the method further comprises:
   monitoring the paging message in a second periodicity, wherein the paging message is used to indicate that a system message changes or indicate the terminal device to receive a service related to the terminal device, and the second periodicity is greater than the first periodicity.

8. A communication method, wherein the method is applicable to a network device, and the method comprises:
sending a paging message to a terminal device, wherein the paging message comprises first information used to indicate a resource location of a public warning system message, the resource location of the public warning system message comprises (1) a system information (SI) window location of the public warning system message or (2) a time-frequency resource location of the public warning system message, and the paging message is used by the terminal device to receive the public warning system message based on (1) a system information (SI) window location of the public warning system message or (2) a time-frequency resource location of the public warning system message.

9. The method according to claim 8, wherein:
the first information comprises scheduling information and indication information of the public warning system message, and the indication information is used to indicate a sequence number of the scheduling information in a system message scheduling information list.

10. The method according to claim 8, wherein:
the first information comprises downlink control information used to indicate the time-frequency resource location of the public warning system message.

11. The method according to claim 8 wherein the method further comprises:
sending wake-up indication information to the terminal device, wherein the wake-up indication information is used to indicate the terminal device to receive the public warning system message.

12. The method according to claim 11, wherein the method further comprises:
sending a first broadcast message to the terminal device, wherein the first broadcast message comprises first periodicity information used to indicate that a sending periodicity of the wake-up indication information is a first periodicity.

13. The method according to claim 11, wherein the method further comprises:
sending a second broadcast message to the terminal device, wherein the second broadcast message is used to indicate that the network device supports sending of the wake-up indication information.

14. An apparatus, comprising:
one or more processors; and
one or more memories coupled to the one or more processors and storing programming instructions for execution by the one or more processors to cause the apparatus to perform operations comprising:
receiving a paging message from a network device, wherein the paging message comprises first information, and the first information is used to indicate a resource location of a public warning system message, and wherein the resource location of the public warning system message comprises (1) a system information (SI) window location of the public warning system message or (2) a time-frequency resource location of the public warning system message; and
receiving the public warning system message based on the paging message, wherein receiving the public warning system message based on the paging message comprises:
receiving the public warning system message based on (1) a system information (SI) window location of the public warning system message or (2) a time-frequency resource location of the public warning system message.

15. The apparatus according to claim 14, wherein:
the first information comprises scheduling information and indication information of the public warning system message, and the indication information is used to indicate a sequence number of the scheduling information in a system message scheduling information list.

16. The apparatus according to claim 14, wherein:
the first information comprises downlink control information used to indicate the time-frequency resource location of the public warning system message.

17. The apparatus according to claim 16, wherein the operations further comprise:
monitoring the paging message on continuous paging occasions.

18. The apparatus according to claim 14, wherein the operations further comprise:
receiving wake-up indication information from the network device, wherein the wake-up indication information is used to indicate a terminal device to receive the public warning system message.

19. The apparatus according to claim 18, wherein the operations further comprise:
receiving a first broadcast message from the network device, wherein the first broadcast message comprises first periodicity information, and the first periodicity information is used to indicate that a sending periodicity of the wake-up indication information is a first periodicity.

20. The apparatus according to claim 19, wherein the operations further comprise:
monitoring the paging message in a second periodicity, wherein the paging message is used to indicate that a system message changes or indicate the terminal device to receive a service related to the terminal device, and the second periodicity is greater than the first periodicity.

* * * * *